United States Patent
Brewer et al.

(10) Patent No.: US 12,500,223 B2
(45) Date of Patent: Dec. 16, 2025

(54) ANODES FOR LITHIUM-BASED ENERGY STORAGE DEVICES

(71) Applicant: Graphenix Development, Inc., Williamsville, NY (US)

(72) Inventors: John C. Brewer, Rochester, NY (US); Paul D. Garman, Pittsford, NY (US); Robert G. Anstey, Tonawanda, NY (US); Kevin Tanzil, Rochester, NY (US)

(73) Assignee: Graphenix Development, Inc., Williamsville, NY (US)

( * ) Notice: Subject to any disclaimer, the term of this patent is extended or adjusted under 35 U.S.C. 154(b) by 523 days.

(21) Appl. No.: 17/908,657

(22) PCT Filed: Apr. 7, 2021

(86) PCT No.: PCT/US2021/026179
§ 371 (c)(1),
(2) Date: Sep. 1, 2022

(87) PCT Pub. No.: WO2021/207357
PCT Pub. Date: Oct. 14, 2021

(65) Prior Publication Data
US 2023/0142782 A1 May 11, 2023

Related U.S. Application Data

(60) Provisional application No. 63/006,807, filed on Apr. 8, 2020.

(51) Int. Cl.
*H01M 4/134* (2010.01)
*H01M 4/131* (2010.01)
(Continued)

(52) U.S. Cl.
CPC ........... *H01M 4/134* (2013.01); *H01M 4/131* (2013.01); *H01M 4/136* (2013.01); *H01M 4/626* (2013.01);
(Continued)

(58) Field of Classification Search
CPC .... H01M 4/0445; H01M 4/131; H01M 4/134; H01M 4/136; H01M 4/364; H01M 4/386;
(Continued)

(56) References Cited

U.S. PATENT DOCUMENTS 5,567,474 A 10/1996 Dover et al.
5,776,369 A 7/1998 Dover et al.
(Continued)

FOREIGN PATENT DOCUMENTS

EP 3375027 A1 9/2018
WO 2015175509 A1 11/2015
(Continued)

OTHER PUBLICATIONS

"Goldman et al., Strain Anisotropies and Self-Limiting Capacities in Single-Crystalline 3D Silicon Microstructures: Models for High Energy Density Lithium-Ion Battery Anodes, Apr. 12, 2011, Advanced Functional Materials, vol. 21" (Year: 2011).*
(Continued)

*Primary Examiner* — Milton I Cano
*Assistant Examiner* — Jesse J Efymow
(74) *Attorney, Agent, or Firm* — Polsinelli LLP

(57) ABSTRACT

An anode for an energy storage device includes a current collector having an electrically conductive layer that includes nickel or copper, and a lithium storage structure comprising a plurality of first microstructures in contact with the electrically conductive layer. Each first microstructure includes silicon and is characterized by a first maximum width measured across the widest section orthogonal to the
(Continued)

first microstructure axis. Each first microstructure includes a first portion characterized by the width substantially tapering from the maximum width to a location where each first microstructure contacts the electrically conductive layer and a second portion positioned farther from the electrically conductive layer than the first portion, the second portion defining a substantially hemispherical shape and the top of each first microstructure. The lithium storage structure has at least 1 mg/cm$^2$ of active silicon and a total atomic % of nickel and copper is from 0.5% to 1.2%.

20 Claims, 14 Drawing Sheets

(51) Int. Cl.
  *H01M 4/136*     (2010.01)
  *H01M 4/62*      (2006.01)
  *H01M 10/0525*   (2010.01)
  *H01M 4/02*      (2006.01)

(52) U.S. Cl.
  CPC .. *H01M 10/0525* (2013.01); *H01M 2004/021* (2013.01)

(58) Field of Classification Search
  CPC ...... H01M 4/485; H01M 4/5825; H01M 4/62; H01M 4/626; H01M 4/661; H01M 10/0525; H01M 2004/021; Y02E 60/10
  See application file for complete search history.

(56) References Cited

U.S. PATENT DOCUMENTS

| | | |
|---|---|---|
| 5,976,403 A | 11/1999 | Dover et al. |
| 6,911,280 B1 | 6/2005 | De Jonghe et al. |
| 7,378,041 B2 | 5/2008 | Asao et al. |
| 7,413,982 B2 | 8/2008 | Levy |
| 7,767,341 B2 | 8/2010 | Kogetsu et al. |
| 8,257,866 B2 | 9/2012 | Loveness et al. |
| 8,377,236 B2 | 2/2013 | Yakovleva et al. |
| 8,906,523 B2 | 12/2014 | Brantner |
| 9,281,515 B2 | 3/2016 | Nazri |
| 9,293,771 B2 | 3/2016 | Tani et al. |
| 9,325,014 B2 | 4/2016 | Lee et al. |
| 9,376,455 B2 | 6/2016 | Lee et al. |
| 9,531,004 B2 | 12/2016 | Xiao et al. |
| 9,768,466 B2 | 9/2017 | Bruckner et al. |
| 9,923,201 B2 | 3/2018 | Wang et al. |
| 10,014,552 B1 | 7/2018 | Shnitser et al. |
| 10,115,960 B2 | 10/2018 | Lee et al. |
| 10,164,252 B2 | 12/2018 | Yang et al. |
| 2005/0031958 A1 | 2/2005 | Fukuoka et al. |
| 2006/0216604 A1 | 9/2006 | Kawase et al. |
| 2010/0216026 A1 | 8/2010 | Lopatin et al. |
| 2010/0285358 A1 | 11/2010 | Cui et al. |
| 2010/0330421 A1 | 12/2010 | Cui et al. |
| 2011/0111304 A1 | 5/2011 | Cui et al. |
| 2011/0159365 A1 | 6/2011 | Loveness et al. |
| 2011/0266654 A1 | 11/2011 | Kuriki et al. |
| 2012/0077082 A1 | 3/2012 | Se-Hee et al. |
| 2012/0121983 A1 | 5/2012 | Yoon et al. |
| 2013/0143124 A1 | 6/2013 | Lee et al. |
| 2014/0011088 A1 | 1/2014 | Lopatin et al. |
| 2014/0248543 A1 | 9/2014 | Zhu et al. |
| 2015/0072119 A1 | 3/2015 | George et al. |
| 2015/0118572 A1 | 4/2015 | Lund et al. |
| 2015/0325852 A1 | 11/2015 | Wang et al. |
| 2016/0351973 A1* | 12/2016 | Albano ................ H01M 4/628 |
| 2017/0133662 A1 | 5/2017 | Cui et al. |
| 2017/0338464 A1 | 11/2017 | Fasching et al. |
| 2018/0083264 A1 | 3/2018 | Soppe |
| 2018/0090755 A1* | 3/2018 | Liu ........................ B82Y 30/00 |
| 2018/0145367 A1 | 5/2018 | Busacca et al. |
| 2018/0166735 A1 | 6/2018 | Busacca et al. |
| 2019/0044151 A1 | 2/2019 | Elam et al. |
| 2019/0088939 A1* | 3/2019 | Wang ................ H01M 10/0525 |
| 2019/0097275 A1 | 3/2019 | Mitlin et al. |
| 2019/0267631 A1* | 8/2019 | Brewer ............. H01M 10/0525 |
| 2019/0273252 A1* | 9/2019 | Loveness .............. H01M 4/667 |
| 2021/0050584 A1 | 2/2021 | Brewer et al. |
| 2021/0057757 A1 | 2/2021 | Brewer et al. |
| 2021/0066702 A1* | 3/2021 | O'Toole ................ H01M 4/667 |

FOREIGN PATENT DOCUMENTS

| | | |
|---|---|---|
| WO | 2016057426 A1 | 4/2016 |
| WO | 2019165412 A1 | 8/2019 |
| WO | 2021029769 A1 | 2/2021 |
| WO | 2021241130 A1 | 2/2021 |
| WO | 2021207357 A1 | 10/2021 |

OTHER PUBLICATIONS

"Talin et al., Fabrication, Testing, and Simulation of All-Solid-State Three-Dimensional Li-Ion Batteries, Nov. 10, 2016, ACS Applied Materials & Interfaces, vol. 8" (Year: 2016).*

"Lethien et al., Micro-patterning of LiPON and lithium iron phosphate material deposited onto silicon nanopillars array for lithium ion solid state 3D micro-battery, Jul. 5, 2011, Microelectric Engineering, vol. 88" (Year: 2011).*

Cho, et al., Electrochemical Properties of Si Film Electrodes Grown on Current Collectors with CuO Nanostructures for Thin-Film Microbatteries, American Scientific Publishers, 2014, vol. 14, 9300-9306, Journal of Nanoscience and Nanotechnology.

Cho, et al., Enhanced Lithium Ion battery Cycling of Silicon Nanowire Anodes by Template Growth to Eliminate Silicon Underlayer Islands, NANO Letters, 2013. vol. 13, 5740-5747.

Alves Dalla Corte, Effects Du Traitment Chimique De La Surface D'une Electrode Negative En Silicium Amorphe Pour Batterie Lithium-ion: Etude Par Spectroscopie Infrarouge In Situ, Ecole Polytechnique Paris Tech, Oct. 2013, 1-139.

Zhao, et al., A General Prelithiation Approach for Group IV Elements and Corresponding Oxides, Energy Storage Materials (2017), http://dx.doi.org/10.1016/j.ensm.2017.06.013, 7 pages.

Wu, et al., Silicon Nitride Coated Silicon Thin Film on Three Dimensions Current Collector for Lithium Ion Battery Anode, Journal of Power Sources 325 (2016) 64-70.

Lee, et al., Growth and Properties of Hybrid Organic-Inorganic Metalcone Films Using Molecular Layer Deposition Techniques, Advanced Functional Materials, 2013, pp. 532-546.

Gomez-Baquero, Silicon Anodes to Enable Better Lithium Ion Batteries, ResearchGate, 2016, 1-28, Besstech, LLC.

Quiroga-Gonzalez, et al., Optimal Conditions for Fast Charging and Long Cycling Stability of Silicon Microwire Anodes for Lithium Ion Batteries, and Comparison with the Performance of Other Si Anode Concepts, Energies, 2013, vol. 6, 5145-5156.

Haro, et al., Nano-Vault Architecture Mitigates Stress in Silicon-Based Anodes for Lithium-Ion Batteries, Communications Materials, 2021, pp. 1-10.

He, et al, Alumina-Coated Patterned Amorphous Silicon as the Anode for a Lithium-Ion Battery with High Coulombic Efficiency, Advanced Materials, 2011, 23, 4938-4941.

Piwko, et al., Hierarchical Columnar Silicon Anode Structures for High Energy Density Lithium Sulfur Batteries, Journal of Power Sources, 351, 2017, pp. 183-191.

Kim, et al., Electrochemical Characteristics of Si/Mo Multilayer Anode for Li Ion Batteries, Revista Mexicana De Fisica, S53, 2007, 17-20.

Kozen, et al., Atomic Layer Deposition of the Solid Electrolyte LiPON, Chemistry of Materials, 2015, 27, 5324-5331.

Lee, et al., Atomic Layer Deposition for Stabilization of Silicon Anodes, National Renewable Energy Laboratory (NREL) Report, 2014.

Li, et al., Artificial Solid Electrolyte Interphase To Address the Electrochemical Degradation of Silicon Electrodes, dx.doi.org/10.1021/am5009419, ACS Applied Materials & Interfaces, 2014, 6, 10083-10088.

(56) References Cited

OTHER PUBLICATIONS

Zhu, et al., Achieving High-Performance Silicon Anodes of Lithium-Ion Batteries via Atomic and Molecular Layer Deposited Surface Coatings: an Overview, Electrochimica Acta, 251, 2017, pp. 710-728.

Notten, Advanced Energy Storage Materials for Battery Applications, Advanced Materials, Dec. 12, 2012, pp. 1-50, NL Agency Ministry of Economic Affairs, Agriculture and Innovation.

Sakabe, et al., Porous Amorphous Silicon Film Anodes for High-Capacity and Stable All-Solid-State Lithium Batteries, Communications Chemistry, 2018, 1:24, pp. 1-9.

Pearse, et al., Nanoscale Solid State Batteries Enabled By Thermal Atomic Layer Deposition of a Lithium Polyphosphazene Solid State Electrolyte, Chem. Mater. 2017, 29, 31 pages.

Nguyen, et al., Alumina-Coated Silicon-Based Nanowire Arrays for High Quality Li-ion Battery Anodes, Journal of Materials Chemistry, 2012, 22, 24618-24626.

Domi, et al., Effect of Mechanical Pre-Lithiation on Electrochemical Performance of Silicon Negative Electrode for Lithium-Ion Batteries, Journal of the Electrochemical Society, 164(7), A1651-A1654, 2017.

Salah, et al., Pure Silicon Thin-Film Anodes for Lithium Ion Batteries: A Review, Journal of Power Sources, 2019, vol. 414, 48-67.

Stefan, A Commercially Scalable Process for Silicon Anode Prelithiation, Amprius Inc, DOE Merit Review, Jun. 6-10, 2016, Project ES250 https://www.energy.gov/sites/prod/files/2016/06/f32/es250_stefan_2016_o_web.pdf, 23 pages.

Ulvestad, et al., Silicon Nitride Coated Silicon Thin Films as Anodes for Li-Ion Batteries, ECS Transactions, 64 (22) 107-111 (2015).

Ulvestad, et al., Silicon Nitride as Anode Material for Li-ion Batteries: Understanding the SiNx Conversion Reaction, Journal of Power Sources, 399, 2018, pp. 414-421.

Holstiege, et al., Pre-Lithiation Strategies for Rechargeable Energy Storage Technologies: Concepts, Promises and Challenges, Batteries 2018, 4, 4, 39 pages.

Xu, et al., A High-Performance Li-ion Anode from Direct Deposition of Si Nanoparticles, Nano Energy, 38, 2017, pp. 477-485.

Xu, et al., Supplemental Info, A High-Performance Li-ion Anode from Direct Deposition of Si Nanoparticles, Nano Energy, 38, 2017, pp. 1-10.

Xu, et al., Engineering the Direct Deposition of Si Nanoparticles for Improved Performance in Li-Ion Batteries, Journal of The Electrochemical Society, 166(3) A5252-A5258, 2019.

PCT/US2021/026179 received an International Search Report and Written Opinion mailed Jul. 9, 2021, 9 pages.

\* cited by examiner

160

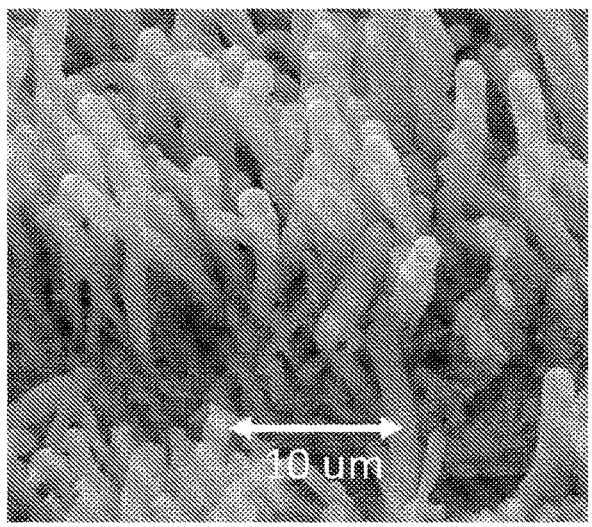 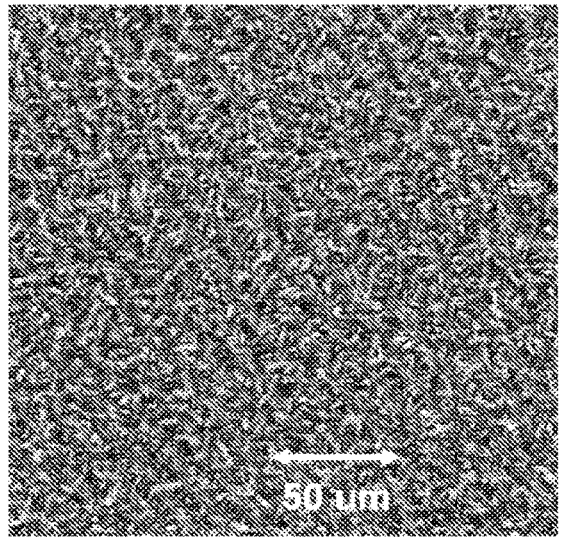
FIG. 16A                    FIG. 16B
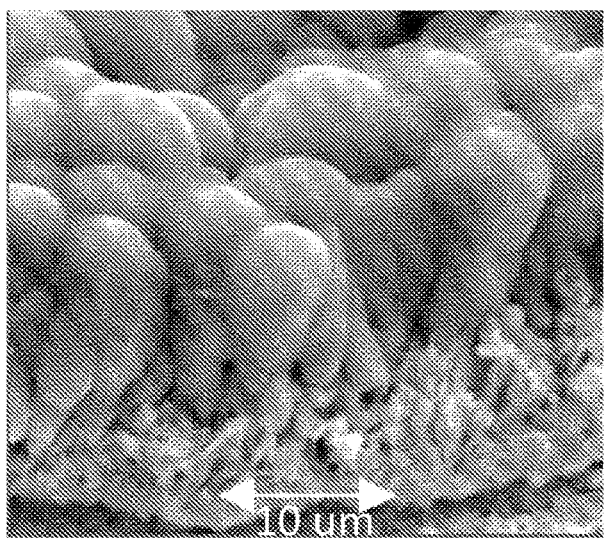 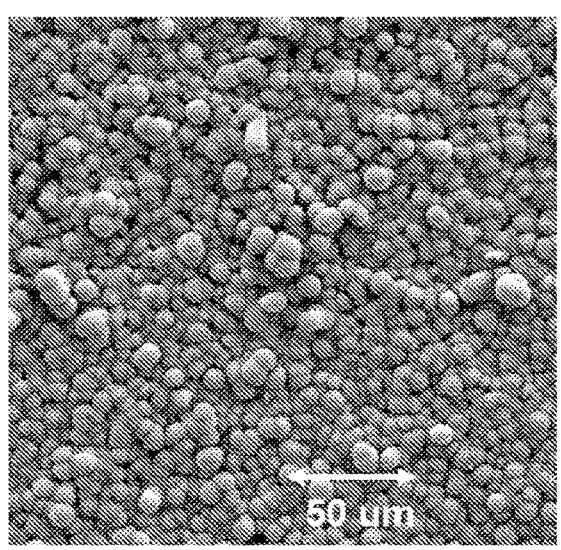
FIG. 17A                    FIG. 17B

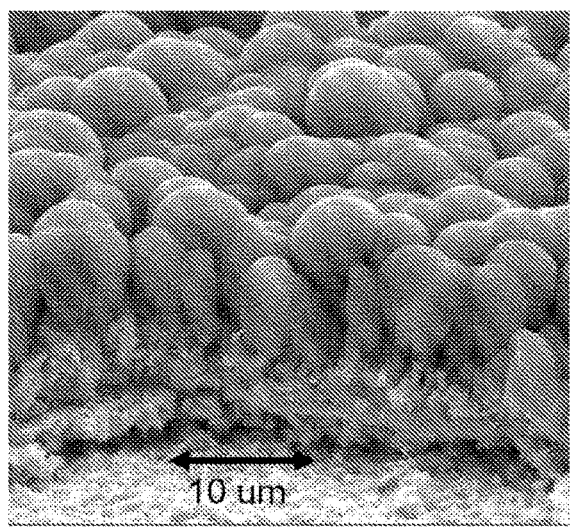 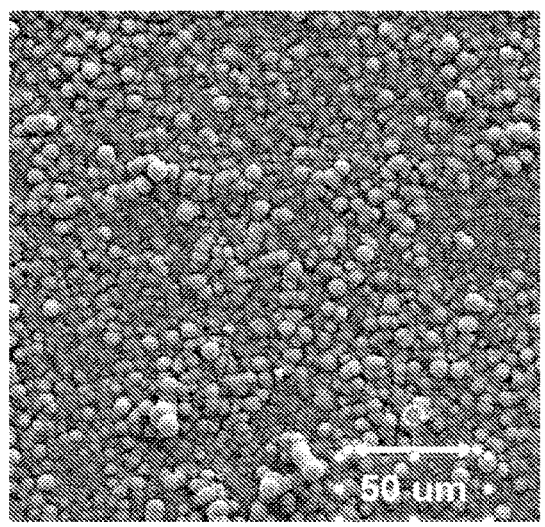
FIG. 18A                    FIG. 18B

ANODES FOR LITHIUM-BASED ENERGY STORAGE DEVICES

CROSS REFERENCE TO RELATED APPLICATION

This application is a U.S. National Phase of PCT/US21/26179, filed Apr. 7, 2021, entitled "ANODES FOR LITHIUM-BASED ENERGY STORAGE DEVICES," which claims priority to U.S. Provisional Application No. 63/006,807, filed on Apr. 8, 2020, the entire contents of which are incorporated herein by reference in their entirety for all purposes.

TECHNICAL FIELD

The present disclosure relates to lithium ion batteries and related energy storage devices.

BACKGROUND

Silicon has been proposed for lithium-ion batteries to replace the conventional carbon-based anodes, which have a storage capacity that is limited to ~370 mAh/g. Silicon readily alloys with lithium and has a much higher theoretical storage capacity (3600 to 4200 mAh/g at room temperature) than carbon anodes. However, alloying and de-alloying of lithium into the silicon matrix causes significant volume expansion (>300%) and contraction. This can result in rapid pulverization of the silicon into small particles and electrical disconnection from the current collector.

The industry has recently turned its attention to nano-structured silicon to reduce the pulverization problem, i.e., silicon in the form of spaced apart nano-wires, -tubes, -pillars, -particles and the like. The theory is that making the structures nano-sized avoids crack propagation and spacing them apart allows more room for volume expansion, thereby enabling the silicon to absorb lithium with reduced stresses and improved stability compared to, for example, macroscopic layers of bulk silicon.

Despite research into various approaches batteries based primarily on silicon have yet to make a large market impact due to unresolved problems. There remains a need for anodes for lithium-based energy storage devices such as Li-ion batteries that are easy to manufacture, robust to handling, high in charge capacity and amenable to fast charging, for example, at least 3C.

SUMMARY

In accordance with an embodiment of this disclosure, an anode for an energy storage device includes a current collector having an electrically conductive layer and a lithium storage structure including a plurality of first microstructures in contact with the electrically conductive layer. Each first microstructure includes silicon and is characterized by a first maximum width measured across the widest section orthogonal to the first microstructure axis. Each first microstructure includes a first portion, the first portion characterized by the width substantially tapering from the maximum width to a location where each first microstructure contacts the electrically conductive layer. Each first microstructure further includes a second portion, the second portion positioned farther away from the electrically conductive layer than the first portion is from the electrically conductive layer, the second portion defining a substantially hemispherical shape and the top of each first microstructure. The electrically conductive layer includes nickel or copper, the lithium storage structure has at least 1 mg/cm$^2$ of active silicon, and the lithium storage structure comprises a total atomic % of nickel and copper of less than 1.2%.

The present disclosure provides anodes for energy storage devices that may have, but is not limited to, one or more of the following advantages or features: improved cycling stability; improved stability at high charging rates; high charge capacity; improved physical durability; and a simple manufacturing process.

BRIEF DESCRIPTION OF DRAWINGS

FIGS. 16A and 16B are perspective and top view SEMS, respectively, of a comparative anode.

FIGS. 17A and 17B are perspective and top view SEMS, respectively, of an example anode according to the present disclosure.

FIGS. 18A and 18B are perspective and top view SEMS, respectively, of an example anode according to the present disclosure.

DETAILED DESCRIPTION

It is to be understood that the drawings are for purposes of illustrating the concepts of the disclosure and may not be to scale.

Figure 1:
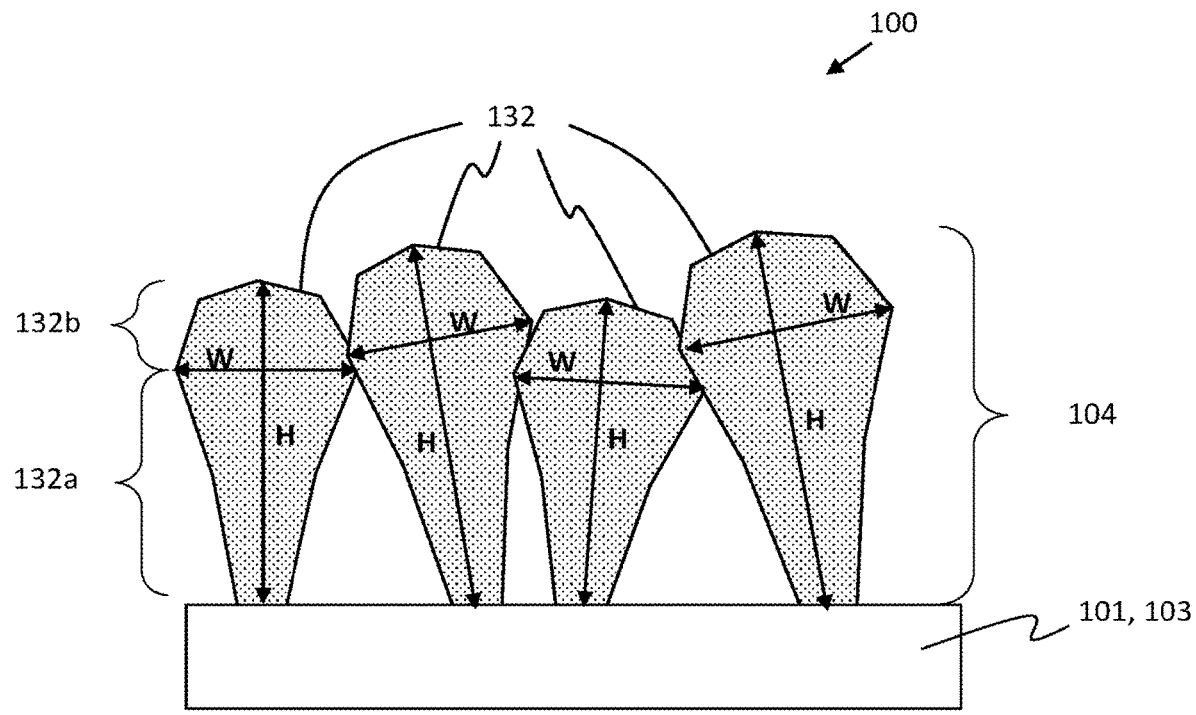
FIG. 1 is a cross-sectional view of an anode according to some embodiments of the present disclosure.

FIG. 1 is a cross-sectional view of an anode according to some embodiments of the present disclosure. Anode 100 includes a current collector 101 having an electrically conductive layer 103 and a lithium storage structure 104 over the electrically conductive layer. Lithium storage structure includes a plurality of first microstructures 132 formed in contact with the electrically conductive layer. The first microstructures include a lithium storage material capable of reversibly incorporating lithium. In some embodiments, the first microstructures may include a porous material. In some embodiments, the first microstructures may include silicon, germanium, tin, antimony, or a combination thereof. In some embodiments, the first microstructures contain at least 50 atomic % silicon, alternatively at least 60%, alternatively at least 70%, alternatively at least 80%, alternatively at least 90%.

Each first microstructure is characterized by a first maximum width W measured across the widest section orthogonal to the first microstructure axis, and by a first height H measured from the electrically conductive layer to its end along the first microstructure axis. The first microstructure axis is the longitudinal axis of the first microstructure. The first microstructure axis may pass through the center of mass of the first microstructure. Each first microstructure includes a first portion 132a characterized by the width substantially tapering from the maximum width to a location where it contacts the electrically conductive layer. Each first microstructure also includes a second portion 132b, the second portion positioned farther away from the electrically conductive layer than the first portion is from the electrically conductive layer, the second portion defining a substantially hemispherical shape and the top of each first microstructure.

Figures 2A, 2B, 2C:
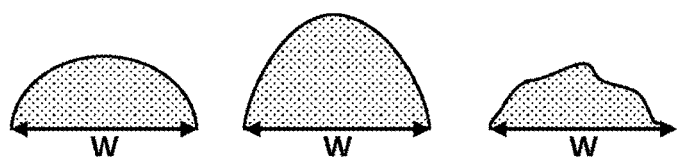
FIGS. 2A-2F are cross-sectional views illustrating some of the various shapes that may be assumed by a second portion of a first microstructure.
Figures 2D, 2E, 2F:
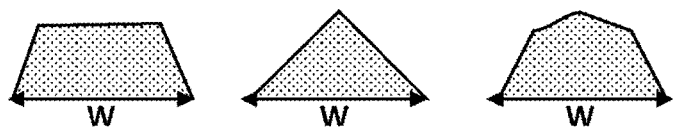
Figure 3A:
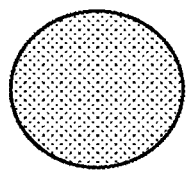
FIGS. 3A-3L are top views illustrating some of the various shapes that may be assumed by a second portion of a first microstructure.
Figure 3B:
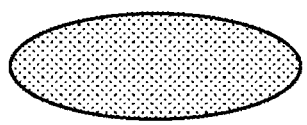
Figure 3C:
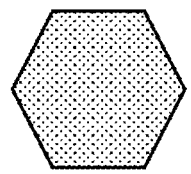
Figure 3D:
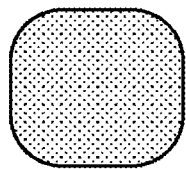
Figure 3E:
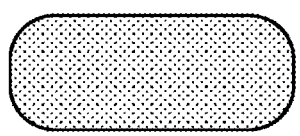
Figure 3F:
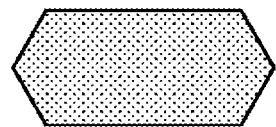
Figure 3G:
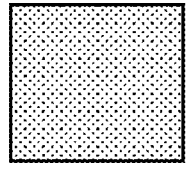
Figure 3H:
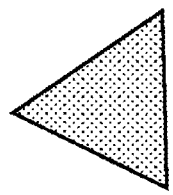
Figure 3I:
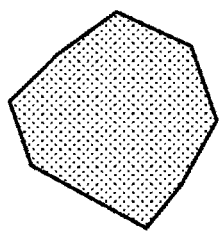
Figure 3J:
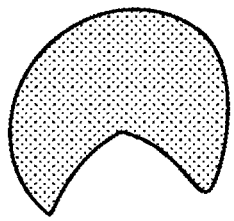
Figure 3K:
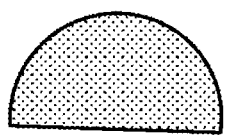
Figure 3L:
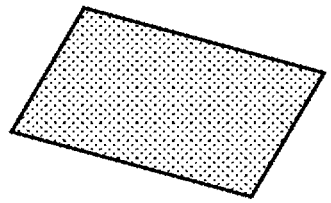

The term "substantially hemispherical shape" encompasses a broad number of structures. FIGS. 2 and 3 illustrate just a few substantially hemispherical shapes contemplated by the present disclosure which may correspond to second portion 132b. FIGS. 2A-2F illustrate various non-limiting cross-sectional views of second portion 132b and FIGS. 3A-3L shows various, non-limiting top views of second portion 132b. As shown in FIG. 2, in some embodiments, a substantially hemispherical shape may have a smoothly rounded surface, a faceted surface structure, a conical surface, or an irregular surface. As shown in FIG. 3, the top view shape of the second portion 132b may appear circular, oval, oblong, polygonal, or irregular, and may be matched to any of the cross-sectional views of FIG. 2. Substantially hemispherical shapes may be characterized by a cross-sectional area through the maximum width. The cross-sectional area may taper to a smaller area along the first height. The minimum cross-sectional area of the substantially hemispherical shape may be at the maximum value of the first height.

In some embodiments, the first microstructures have a first height of at least 9 µm and a first maximum width of at least 4.5 µm. In some embodiments the first microstructures have a first height in a range of 9 µm to 15 µm, alternatively 15 µm to 20 µm, alternatively, 20 µm to 25 µm, alternatively 25 µm to 30 µm, alternatively 30 µm to 35 µm, alternatively 35 µm to 40 µm, alternatively 40 µm to 50 µm, alternatively 50 µm to 60 µm or an combination of contiguous ranges thereof. In some embodiments, the first microstructures have a first maximum width in a range of 4.5 µm to 6 µm, alternatively 6 µm to 8 µm, alternatively, 8 µm to 10 µm, alternatively 10 µm to 12 µm, alternatively 12 µm to 14 µm, alternatively 14 µm to 16 µm, or any combination of contiguous ranges thereof. The first microstructures each have an aspect ratio defined as the first height divided by the first maximum width. In some embodiments, the first microstructures have a first aspect ratio in a range of 1.4 to 1.6, alternatively 1.6 to 1.8, alternatively 1.8 to 2.0, alternatively 2.0 to 2.5, alternatively 2.5 to 3.0, alternatively 3.0 to 3.5, alternatively 3.5 to 4.0, or any combination of contiguous ranges thereof. The height, maximum width and aspect ratio described herein may represent the mean average, median, or mode of the first microstructures.

Unlike nanowires of the prior art, which are mostly spaced apart and have aspect ratios of greater than 4, the first microstructures of the present disclosure are tightly packed, i.e., spaced very close to one another and often in contact. In some embodiments, at least 50%, alternatively at least 70%, alternatively at least 80%, alternatively at least 90%, alternatively substantially all of the first microstructures are in contact with at least one other first microstructure, alternatively at least two other first microstructures. Despite prior art suggestions to avoid tight packing of lithium storage structures to allow for expansion during lithiation, it has been unexpectedly found that first microstructures according to various embodiments of the present disclosure may provide anodes having high charge capacity and cycle stability even at high charge rates such as 3C.

Figure 4:
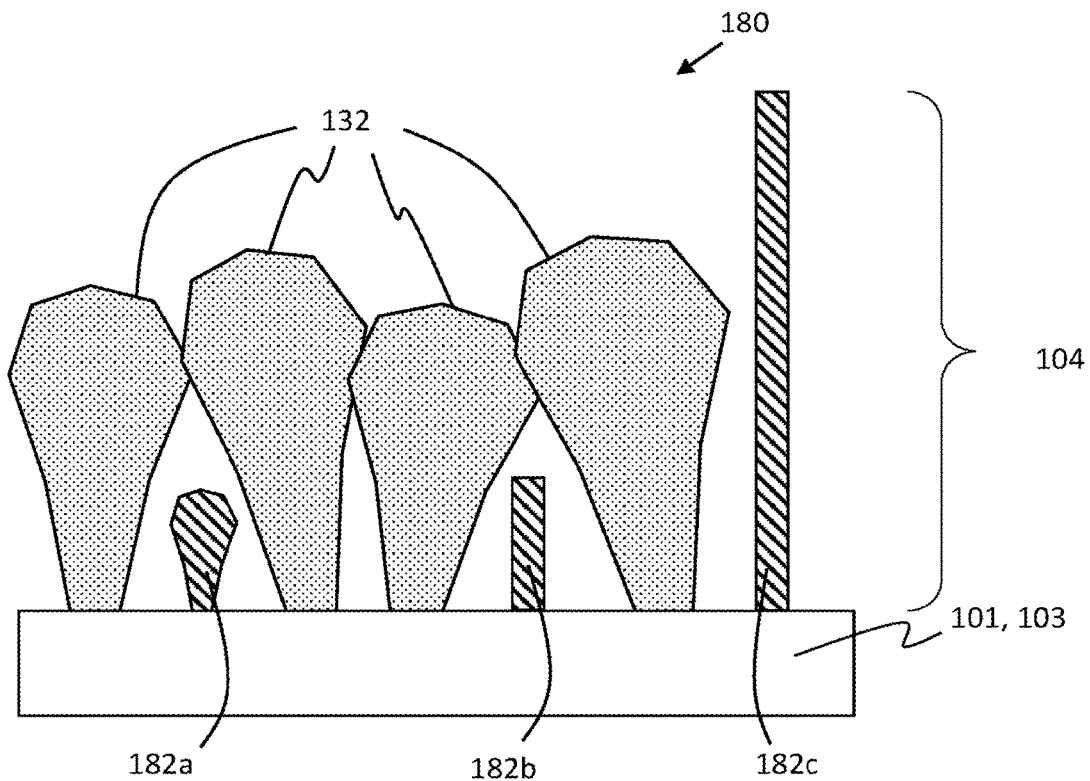
FIG. 4 is a cross-sectional view of an anode according to some embodiments of the present disclosure.

Anodes of the present disclosure may further comprise second microstructures that are substantially different than the first microstructures. As shown in FIG. 4, anode 180 is similar to anode 100 except that lithium storage structure 104 further includes one or more second microstructures 182 in contact with the electrically conductive layer. In some embodiments, the second microstructures may include silicon. Although not explicitly shown in FIG. 4, the second microstructures can be characterized in a manner analogous to the first microstructures as having a second height and a second maximum width. In some embodiments, the second microstructures are shorter than the first microstructures, i.e., they have a second height that is less than the first height of the first microstructures, as exemplified in second microstructures 182a and 182b. In some embodiments, the second microstructures are not as wide as the first microstructures, i.e., they have a second maximum width less than the first maximum width of the first microstructures, as exemplified in second microstructures 182a, 182b, and 182c. In some embodiments, the second microstructures are characterized by a second aspect ratio that is greater than the first aspect ratio microstructures, as exemplified in second microstructures 182b and 182c. The second microstructures may include nanopillars or nanowires (e.g., 182b and 182c) or the second microstructures may be smaller versions of the first microstructures (e.g., 182a).

The second microstructures may have some lithium storage capacity, but in some embodiments, the first microstructures account for at least 50% of the lithium storage capacity of the anode, alternatively at least 80%, alternatively at least 90%.

Electrically Conductive Layer/Current Collector

In some embodiments, the electrically conductive layer includes a metallic material, e.g., nickel (and its alloys), copper (and its alloys), or stainless steel. In some embodiments, the electrically conductive layer includes an electrically conductive carbon, such as carbon black, graphene, graphene oxide, graphite, carbon nanotubes, or fullerene. In some embodiments the electrically conductive layer may have a conductivity of at least 1 S/m, $10^3$ S/m, or alternatively at least $10^6$ S/m, or alternatively at least $10^7$ S/m, and may include inorganic or organic conductive materials, or a combination thereof.

Figure 5:
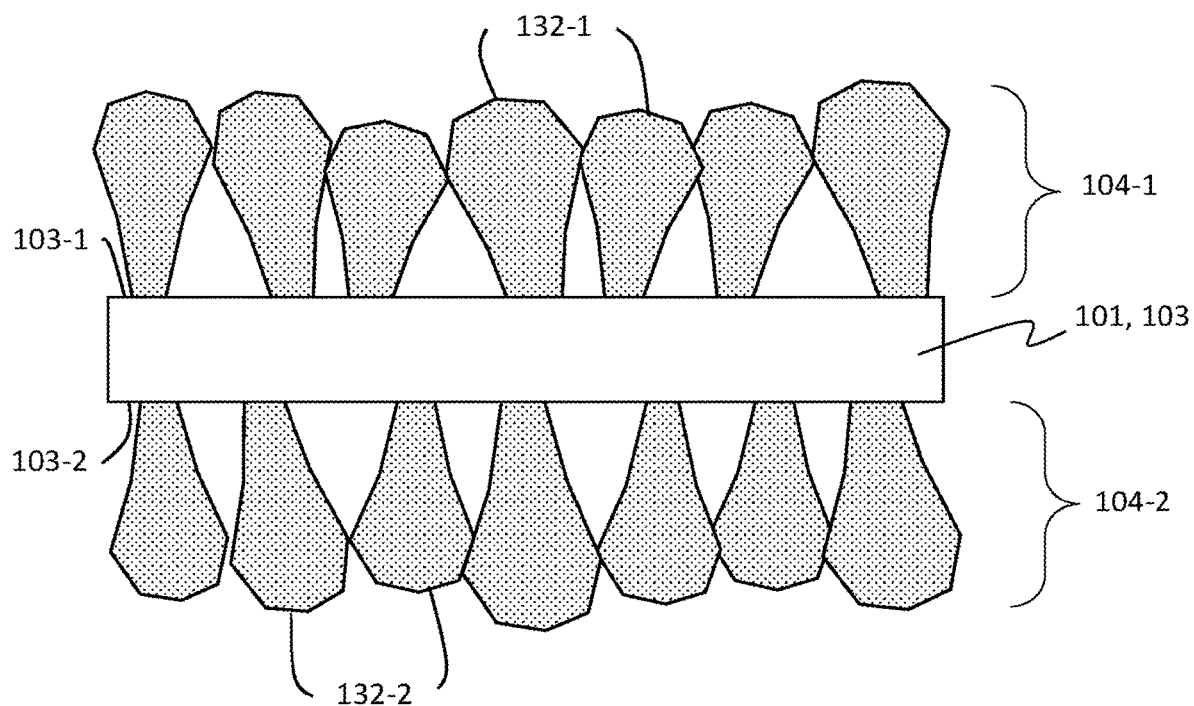
FIG. 5 is a cross-sectional view of an anode according to some embodiments of the present disclosure.

The current collector may be a continuous foil or sheet but may alternatively be a wire mesh, have a fabric-like structure or have some other 3-dimensional structure. In some embodiments, the current collector 101 and the electrically conductive layer 103 may be one and the same, for example, when the current collector has substantially a single composition and does not have a multilayered structure. Such embodiment is shown in FIG. 1 and FIG. 4. Referring to FIG. 5, in some embodiments, a lithium storage structure 104-1 having first microstructures 132-1 is provided over a first side 103-1 of the electrically conductive layer 103, and another lithium storage structures 104-2 having first microstructures 132-2 is provided on a second side 103-2 of the electrically conductive layer 103. In some embodiments, the first microstructures 103-1 of lithium storage structure 104-1 are substantially the same as the first microstructures 103-2 of lithium storage structure 104-2 with respect to structural dimensions, chemical composition, or both. In some embodiments, the first microstructures 103-1 may differ from first microstructures 103-2 with respect to structural dimensions, e.g., by more than 10% with respect to height, maximum width, or aspect ratio, to chemical composition, e.g., the relative elemental composition differs by at least 10% with respect to at least one element present in at least 0.1 atomic %, or both. Alternatively, one side may include second microstructures and the other side may not include such second microstructures, or the second microstructures are different. Alternatively, one side may not include any first microstructures and instead include a substantially different type of lithium storage layer or material (e.g., a continuous layer or high aspect ratio nanostructures). In some embodiments, one side may include a lithium storage layer as disclosed in U.S. patent application Ser. No. 16/285,842 which is herein incorporated by reference for all purposes.

Figure 6:
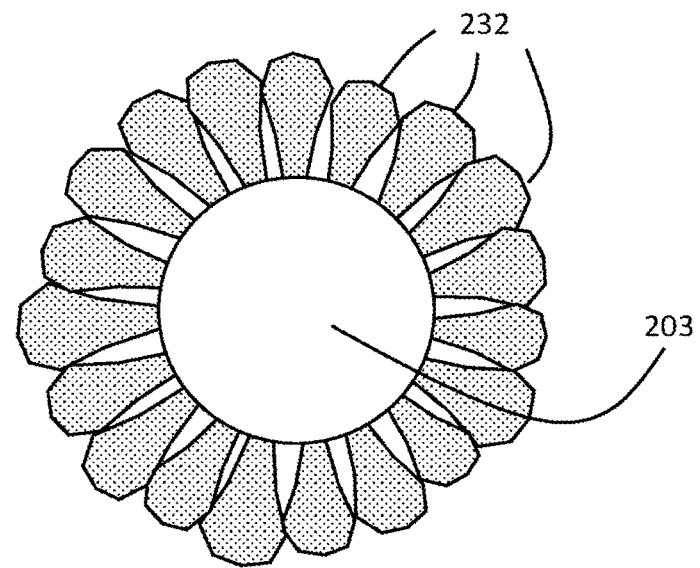
FIG. 6 is a cross-sectional view of an anode according to some embodiments of the present disclosure.

In the case where the current collector or electrically conductive layer take the form of a wire mesh or fabric, the lithium storage structure may be provided over the entire mesh or fabric, e.g., as shown in FIG. 6 that illustrates a cross-section of the mesh or fabric "wire" which acts as the electrically conductive layer. FIG. 6 shows the lithium storage structure having first microstructures 232 provided in an approximately conformal manner around the electrically conductive layer wire 203, but in other embodiments the lithium storage structure may be provided non-conformally or only a portion of the mesh wires.

Figure 7:
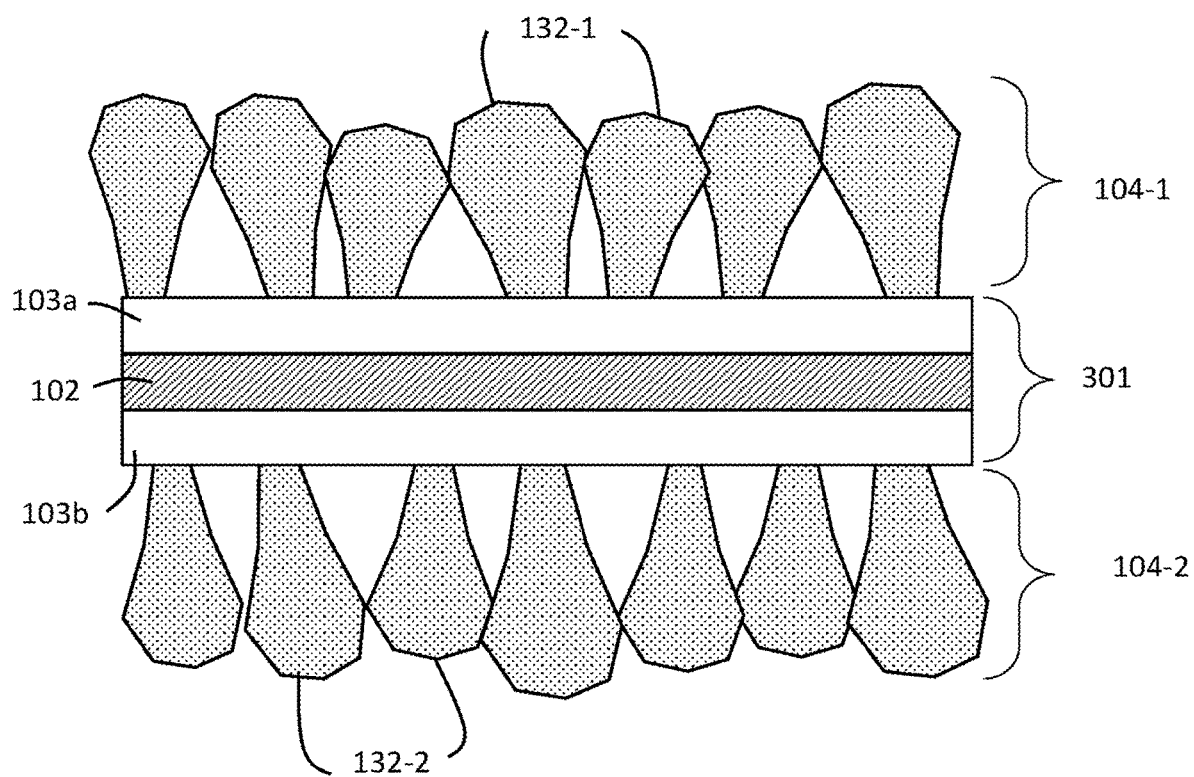
FIG. 7 is a cross-sectional view of an anode according to some embodiments of the present disclosure.

In some embodiments, as shown in cross-section in FIG. 7, the current collector 301 may have a multilayered structure including electrically conductive layers 103a and 103b provided on either side of additional layer 102 that is spaced away from the lithium storage structures 104-1 and 104-2 and their corresponding plurality of first microstructures 132-1 and 132-2. Electrically conductive layers 103a and 103b may be the same or different, e.g., with respect to chemical composition or thickness. As described with respect to FIG. 5 above, first microstructures 132-1 may be the same as or different from first microstructures 132-2. Layer 102 may be electrically insulating, semiconducting or conducting. In some embodiments, layer 102 is an electrically conductive metal or carbon, such as described above with respect to electrically conductive layer. Multilayer current collector 301 may be in the form of a foil or sheet but may alternatively be a wire mesh, have a fabric-like structure or have some other 3-dimensional structure. In some embodiments, layer 102 may include stainless steel or conductive carbon and electrically conductive layer 103a or 103b or both include nickel or copper. In some embodiments, layer 102 may include copper and electrically conductive layers 103a and 103b include nickel. In some embodiments when layer 102 is electrically insulating, the voltage or current applied to conductive layer 103a may be controlled separately from conductive layer 103b. Alternatively, when layer 102 is electrically insulating, electrically conductive layers 103a and 103b may be shorted together elsewhere in the structure (not shown) to allow a common voltage or current.

Formation of First Microstructures

Methods of forming first microstructures in contact with the electrically conductive layer may include a chemical vapor deposition (CVD) method. Such methods are generally known for forming high aspect ratio nanowires, e.g., as described in U.S. Pat. Nos. 9,325,014 and 8,257,866, the entire contents of which are incorporated by reference for all purposes, but such methods may be modified to form tightly packed first microstructures of the present disclosure CVD generally involves flowing a precursor gas, a gasified liquid in terms of direct liquid injection CVD or gases and liquids into a chamber containing one or more objects, typically heated, to be coated. Chemical reactions occur on and near the hot surfaces, resulting in the deposition of a thin film on the surface. This is accompanied by the production of chemical by-products that are exhausted out of the chamber along with unreacted precursor gases. As would be expected with the large variety of materials deposited and the wide range of applications, there are various types of CVD that may be used to form the lithium storage structures, a supplemental layer (see below) or other layers. It may be done in hot-wall reactors or cold-wall reactors, at sub-torr total pressures to above-atmospheric pressures, with or without carrier gases, and at temperatures ranging from 100-1600° C. in some embodiments. There are also a variety of enhanced CVD processes, which involve the use of plasmas, ions, photons, lasers, hot filaments, or combustion reactions to increase deposition rates and/or lower deposition temperatures. Various process conditions may be used to control the deposition, including but not limited to, temperature, precursor material, gas flow rate, pressure, substrate voltage bias (if applicable), and plasma energy (if applicable).

As described below, the lithium storage structures, e.g., those containing silicon, germanium, tin, or a combination, may be provided in part or entirely by plasma-enhanced chemical vapor deposition (PECVD). Relative to thermal CVD, deposition by PECVD can often be done at lower temperatures and higher rates, which can be advantageous for higher manufacturing throughput. In some embodiments, the PECVD may be used to deposit a substantially amorphous silicon material that may optionally be doped.

In PECVD processes, according to various implementations, a plasma may be generated in a chamber in which the substrate is disposed or upstream of the chamber and fed into the chamber. Various types of plasmas may be used including, but not limited to, capacitively-coupled plasmas, inductively-coupled plasmas, and conductive coupled plasmas. Any appropriate plasma source may be used, including DC, AC, RF, VHF, combinatorial PECVD and microwave sources may be used.

PECVD process conditions (temperatures, pressures, precursor gases, carrier gasses, dopant gases, flow rates, energies and the like) can vary according to the particular process and tool used, as is well known in the art.

In some implementations, the PECVD process is an expanding thermal plasma chemical vapor deposition (ETP-PECVD) process. In such a process, a plasma generating gas is passed through a direct current arc plasma generator to form a plasma, with a web or other substrate including the current collector optionally in an adjoining vacuum chamber. A silicon source gas is injected into the plasma, with radicals generated. The plasma is expanded via a diverging nozzle and injected into the vacuum chamber and toward the substrate. An example of a plasma generating gas is argon (Ar). In some embodiments, the ionized argon species in the plasma collide with silicon source molecules to form radical species of the silicon source, resulting in deposition onto the current collector. Example ranges for voltages and currents for the DC plasma source are 60 to 80 volts and 40 to 70 amperes, respectively.

Any appropriate silicon source may be used to deposit silicon, including silane ($SiH_4$), dichlorosilane ($H_2SiCl_2$), monochlorosilane ($H_3SiCl$), trichlorosilane ($HSiCl_3$), silicon tetrachloride ($SiCl_4$), and diethylsilane. Depending on the gas(es) used, the silicon layer may be formed by decomposition or reaction with another compound, such as by hydrogen reduction. In some embodiments, the gases may include a silicon source such as silane, a noble gas such as helium, argon, neon or xenon, optionally one or more dopant gases, and substantially no hydrogen. In some embodiments, the gases may include argon, silane, and hydrogen, and optionally some dopant gases. In some embodiments when forming first microstructures, the gas flow ratio of argon relative to the combined gas flows for silane and hydrogen is at least 3.0, alternatively at least 4.0. In some embodiments, the gas flow ratio of argon relative to the combined gas flows for silane and hydrogen is in a range of 3.0 to 10, alternatively 4.0 to 8.0. In some embodiments, the gas flow ratio of silane relative to the combined gas flows of silane and hydrogen is in a range of 0.20 to 0.95, alternatively 0.30 to 0.80, alternatively 0.40 to 0.70.

In some embodiments, at least the surface of electrically conductive layer 103 includes a filament growth catalyst material. A filament growth catalyst material may assist in initiating and growing the first microstructures, at least at first. For the purposes of this disclosure, filament growth catalyst materials include "true" catalytic materials that remain active indefinitely, and materials that may eventually be consumed during filament growth. In some embodiments the filament growth catalyst material may be a vapor-liquid-solid (VLS) filament growth catalyst material. In some embodiments the filament growth catalyst material may be provided as a substantially continuous layer that corresponds to electrically conductive layer 103. In some embodiments, the electrically conductive layer 103 may include a pattern of filament growth catalyst material where the pattern may be random or predetermined. In some embodiments the electrically conductive layer may be a metal foil that is itself a filament growth catalyst material, for example, nickel. Non-limiting examples of catalyst materials may include non-refractory transition metals and their alloys. The catalyst material may include, for example, nickel, gold, palladium, platinum, ruthenium, aluminum, indium, gallium, tin, or iron, or their alloys.

Figure 8A:
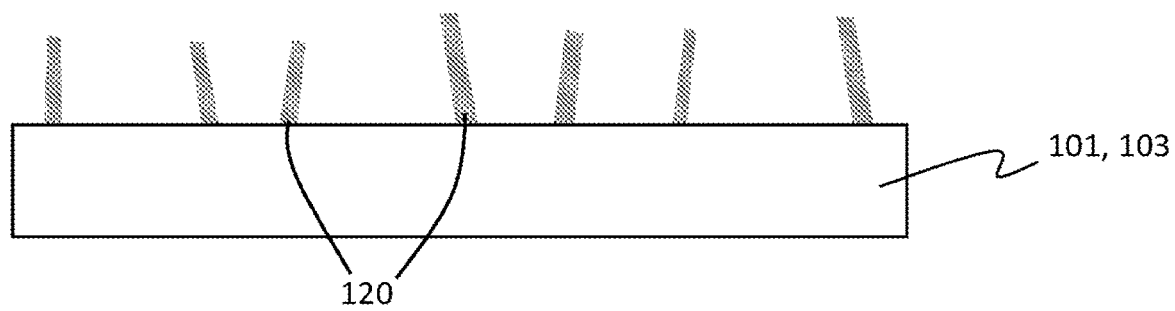
FIGS. 8A and 8B are cross-sectional views illustrating a method for forming an anode according to some embodiments of the present disclosure.

Referring to FIG. 8A, in some embodiments, forming first microstructures may include growing a plurality of base filaments 120 on the electrically conductive layer. In some embodiments this is done by VLS method whereby the current collector is exposed to a filament precursor gas under elevated temperatures. The temperature depends on the catalyst and filament precursor gas, but in some embodiments may be at least 300° C., alternatively at least 400° C., alternatively at least 500° C., alternatively at least 600° C. In some embodiments, the temperature is in a range of 300° C. to 400° C., alternatively 400° C. to 500° C., alternatively 500° C. to 600° C., or any combinations of contiguous ranges thereof. In some embodiments, the filament precursor gas is a silicon-containing gas such as silane or a germanium-containing gas such as germane, but alternative silicon- and germanium-containing gases may be used. In some embodiments, the filaments include a silicide or germanium alloy. The base filaments may be electrically conductive or semi-conductive. In some embodiments the filament growth catalyst material may include nickel and the base filaments include nickel silicide. In some embodiments, the filament growth catalyst material may be consumed during formation of the base filaments.

Figure 8B:
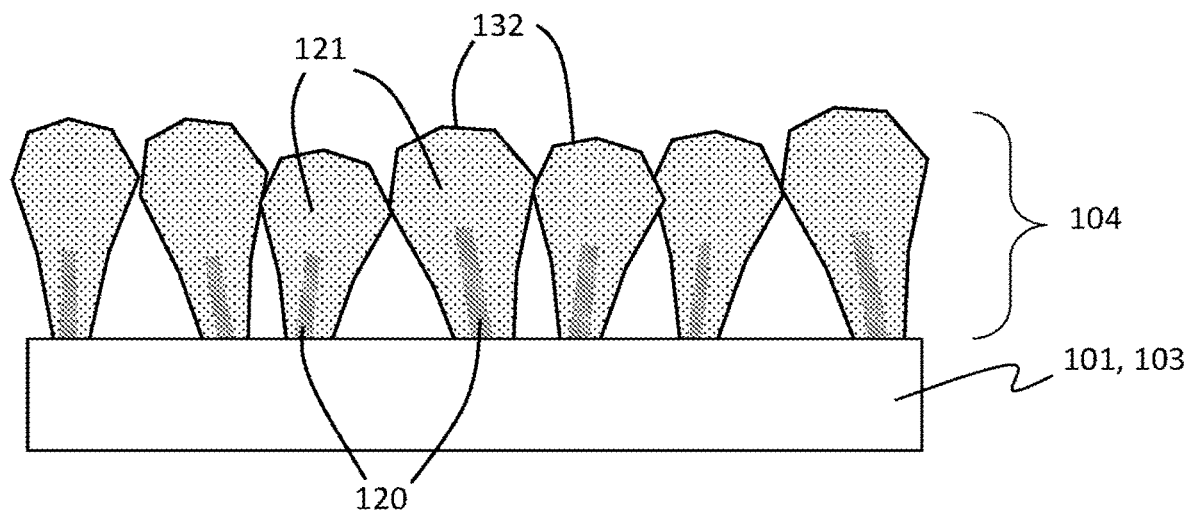

As shown in FIG. 8B, in some embodiments, a plurality of first microstructures 132 may be formed by depositing a lithium storage material 121 over the base filament 120. Lithium storage material 121 may have a different chemical composition than base filament 120. In some embodiments, the lithium storage material may include silicon, germanium, tin, or a combination thereof. In some embodiments, the first microstructures are formed at least in part by some type of a CVD (chemical vapor deposition) process, such as Thermal CVD, HWCVD (hot-wire CVD), and/or PECVD (plasma enhanced chemical vapor deposition). In some embodiments, base filaments 120 may be grown by a thermal CVD process and lithium storage material may be deposited by HWCVD or PECVD. In some embodiments, base filaments 120 may be grown by PECVD and the lithium storage material 121 may also be deposited by PECVD. The vapor deposition process may include a lithium storage precursor gas that contains silicon (e.g., silane), germanium (e.g., germane), or tin (e.g., Sn(IV) tert-butoxide). In some embodiments, base filaments 120 may be grown in a separate step or chamber than lithium storage material 121 deposition. In some embodiments, base filaments 120 may be grown in the same chamber as used for depositing lithium storage material 121. In some embodiments, the growth of base filaments and formation of first microstructures 132 may be performed in a common step without substantially changing conditions, e.g., by using a catalyst that is consumed, such that base filament formation stops and deposition of lithium storage material 121 begins. That is, the base filament formation may be self-limiting. Alternatively, conditions are altered after base filament growth (temperature, precursor gas, gas pressure, carrier or other gasses, plasma power, deposition angle, or the like) to promote deposition of lithium storage material 121 and formation of the first microstructures 132. Although FIG. 8B shows a discrete base filament, in some embodiments, no base filament is present. For example, there may be gradual transition between initial base filament formation and lithium storage material deposition. In some embodiments, the first microstructures may include a metal silicide base filament 120 (e.g. a nickel silicide or copper silicide) and a silicon-containing lithium storage material 121 that may also contain some of the metal but at a lower atomic % than the base filament portion. That is, the lithium storage material 121 may have a higher atomic % silicon than the base filament 120. In some embodiments, there is a gradient in metal silicide content with highest levels near the electrically conductive layer and lowest levels at the opposite end of the first microstructure. In some embodiments, the base filament portion of the first microstructures may have some lithium storage capacity, but lower than the lithium storage capacity of the lithium storage material portion in terms of mAh/g.

In some embodiments, the first microstructures 132 (or the lithium storage material 121) include substantially amorphous silicon. Such substantially amorphous silicon may include some, e.g., less than 20 atomic %, crystalline silicon (not including any silicides) which may be dispersed therein. The first microstructures 132 (or the lithium storage material 121) may include dopants such as hydrogen, boron, nitrogen, phosphorous, sulfur, fluorine, aluminum, gallium, indium, arsenic, antimony, bismuth, or other metallic elements. In some embodiments the first microstructures 132 (or the lithium storage material 121) may include substantially amorphous hydrogenated silicon (a-Si:H), having, e.g., a hydrogen content of from 0.1 to 20 atomic %, or alternatively higher. In some embodiments, the first microstructures 132 (or the lithium storage material 121) may include methylated amorphous silicon.

Figure 9:
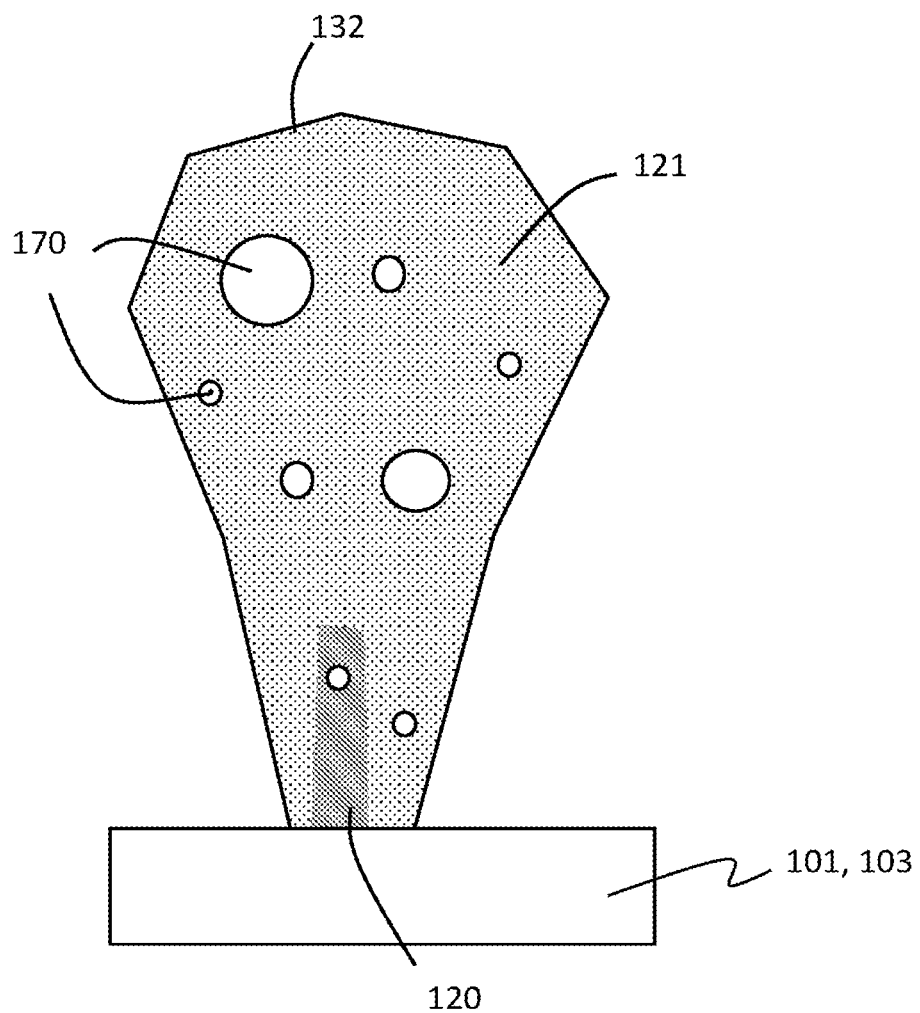
FIG. 9 is a cross-sectional view of a porous first microstructure according to some embodiments of the present disclosure.

In some embodiments, the first microstructures 132 (or lithium storage material 121) are porous, i.e., they include some pores 170 as shown in FIG. 9. The pores may be void spaces or may be occupied by a gas. In some embodiments, the pores have a maximum dimension of less than 3 µm, alternatively less than 2 µm. In some embodiments, the porosity of the first microstructures 132 (or lithium storage material 121), i.e., the volume percent of pores relative to the total volume, is at least 0.1%, alternatively at least 0.5%, alternatively at least 1%, alternatively at least 2%, alternatively at least 5%. In some embodiments, the porosity of the first microstructures 132 (or lithium storage material 121) is less than 50%, alternatively less than 40%, alternatively less than 25%. The porosity of the first microstructures 132 or lithium storage material 121 may be in a range of 0.1% to 0.5%, alternatively 0.5% to 1%, alternatively 1% to 2%, alternatively 2% to 5%, alternatively 5% to 10%, alternatively 10% to 15%, alternatively 15% to 20%, alternatively 20% to 25%, alternatively 25% to 30%, alternatively 30% to 40%, alternatively 40% to 50%, or any combination of contiguous ranges thereof. Pore sizes may be polydisperse or monodisperse and distributed in a random or uniform manner.

In some embodiments, the lithium storage structure may be characterized as having an active silicon areal density of at least 1 mg/cm$^2$, alternatively at least 2 mg/cm$^2$, alternatively at least 3 mg/cm$^2$, alternatively at least 5 mg/cm$^2$. In some embodiments, the lithium storage structure may be characterized as having an active silicon areal density in a range of 1-2 mg/cm$^2$, alternatively in a range of 2-3 mg/cm$^2$, alternatively in a range of 3-5 mg/cm$^2$, alternatively in a range of 5-10 mg/cm$^2$, alternatively in a range of 10-15 mg/cm$^2$, alternatively in a range of 15-20 mg/cm$^2$, or any combination of contiguous ranges thereof. "Active silicon" refers to the silicon in electrical communication with the current collector that is available for reversible lithium storage at the beginning of cell cycling, e.g., after anode "electrochemical formation" discussed later. "Areal density" refers to the surface area of the electrically conductive layer over which active silicon is provided. In some embodiments, not all of the silicon content is active silicon, i.e., some may be tied up in the form of non-active silicides or electrically isolated from the current collector.

In some embodiments, the electrically conductive layer includes nickel or copper, the lithium storage structure includes at least 1.1 mg/cm$^2$ of active silicon, and when analyzed by energy dispersive x-ray spectroscopy (EDS) the lithium storage structure is characterized as having a total atomic % of nickel and copper of less than 1.2%, alternatively less than 1.0%, alternatively less than 0.9%, alternatively less than 0.8%, alternatively less than 0.7%. A typical EDS compositional analysis may be performed using a scanning electron microscope (SEM), for example, a Tescan Mira3 SEM, equipped with an energy dispersive spectrometer, e.g., from Bruker, operating at 20 kV. Measurements may be made at a working distance of about 10 mm from the sample surface, and on a sample area of at least 1600 µm$^2$, for example, 40 µm×40 µm regions at 5000× magnification. The EDS measurement defined above may not necessarily be a measurement of the total amount of nickel or copper in the entire lithium storage structure, but it has been found to be a useful metric that relates to the structure of the lithium storage structure. While EDS may be able to probe several microns into a surface, there can be a falloff in sensitivity such that elements nearer the surface may dominate the analysis over elements far down into the layer. A portion of the lithium storage structure including the surface of the lithium storage structure may have a total atomic % of nickel and copper of less than 1.2%, alternatively less than 1.0%, alternatively less than 0.9%, alternatively less than 0.8%, alternatively less than 0.7%. In some embodiments, a portion of the lithium storage structure including the surface of the lithium storage structure may have a total atomic % of nickel and copper of at least 0.05%, alternatively at least 0.1%. In some embodiments, a portion of the lithium storage structure including the surface of the lithium storage structure may have a total atomic % of nickel and copper in a range of 0.05% to 0.1%, alternatively 0.1% to 0.2%, alternatively 0.2% to 0.3%, alternatively 0.3% to 0.4%, alternatively 0.4% to 0.5%, alternatively 0.5% to 0.6%, alternatively 0.6% to 0.7%, alternatively 0.7% to 0.8%, alternatively 0.8% to 0.9%, alternatively 0.9% to 1.0%, alternatively 1.0% to 1.1%, alternatively 1.1% to less than 1.2%. The portion of the lithium storage structure may include the upper 1 µm, 2 µm, 3 µm, 4 µm, or 5 µm of the lithium storage structure. In general, first microstructures having taller height are found by this method to have lower atomic % nickel and copper. This may be due in part to higher metal silicide concentration closer to the electrically conductive layer than at the surface. Further, first microstructure having tighter packing are found by this method to have lower atomic % nickel and copper. This may be due in part to the crowded nature of the first microstructures causing more blocking EDS sampling of the underlying nickel or copper electrically conductive layer. Spaced apart nanowires of the prior art, on the other hand, may permit more EDS sampling of the underlying nickel or copper electrically conductive layer.

In some embodiments, the lithium storage structure may be characterized as having a total reflectance of at least 10% measured at 550 nm, alternatively at least 15%, alternatively at least 20%. Unlike prior art nanowire structures which trap light and appear dark or black, some embodiments of anodes of the present disclosure have higher reflectivity due in part to the tightly packed first microstructures that have less apparent roughness than nanowires and may prevent light trapping.

Compared to prior art nanowires that easily rub off of the current collector, some embodiments of lithium storage structures of the present disclosure are physically more robust to abrasion, handling and other battery assembly operations. This may be due in part to their smoother surface and/or the collective structural support provided by the tight packing of first microstructures.

Supplemental Layers

Figure 10A:
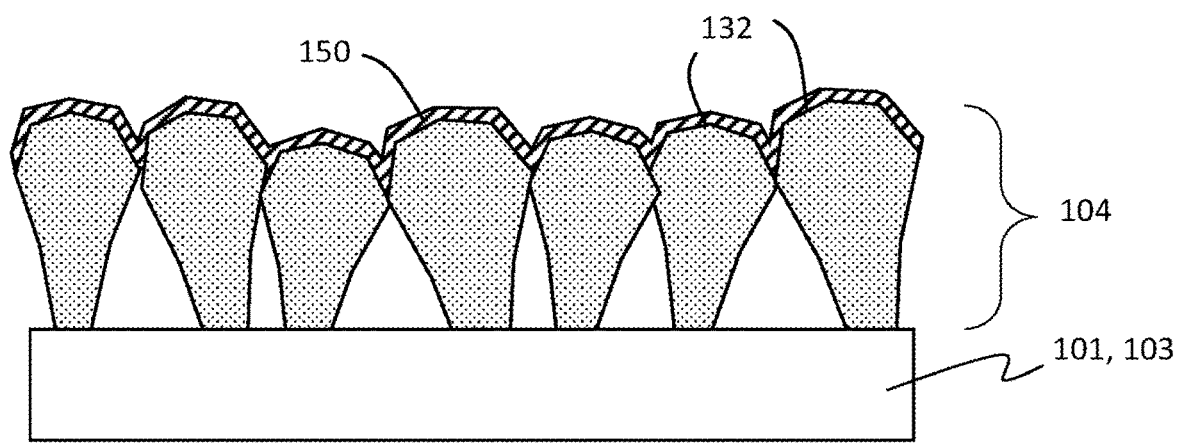
FIGS. 10A and 10B are cross-sectional views of anodes that include a supplemental layer according to some embodiments of the present disclosure.
Figure 10B:
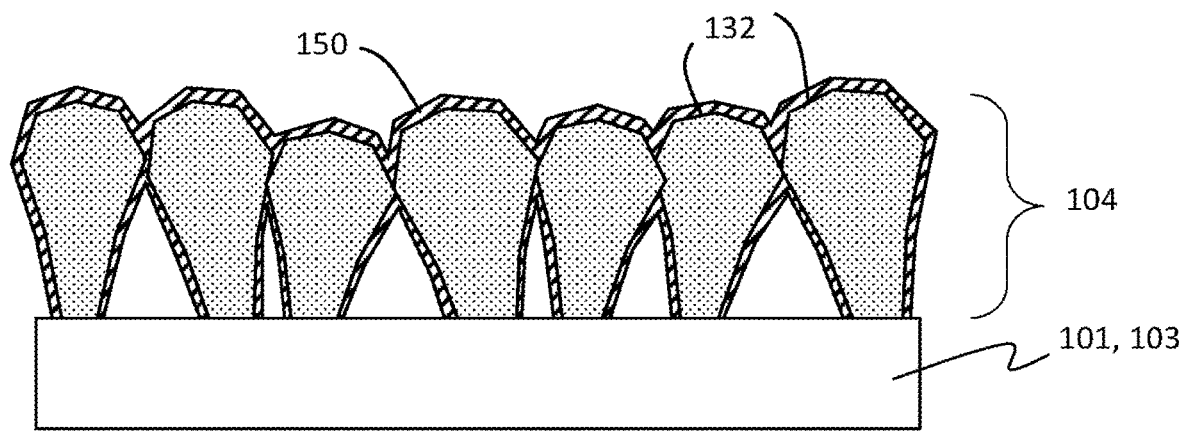

In some embodiments, the anode may further include one or more supplemental layers provided over the lithium storage structure. As shown in FIG. 10A, supplemental layer 150 may be provided primarily over the top portion of the lithium storage structure 104 or first microstructures 132, e.g., primarily over the second portion 132b (referring again to FIG. 1). In some embodiments, as shown in FIG. 10B, supplemental layer 150 may also be provided over more or all of the first microstructures, including some or all of the first portion 132a (referring again to FIG. 1). The degree to which supplemental layer material is provided over first portions 132a of the first microstructures may depend on the packing density of the first microstructures and the coating method. For example, ALD coating methods may be more conformal than some CVD or physical vapor deposition methods. In some embodiments, supplemental layer 150 may include silicon nitride or a metal compound as described below.

Figure 11:
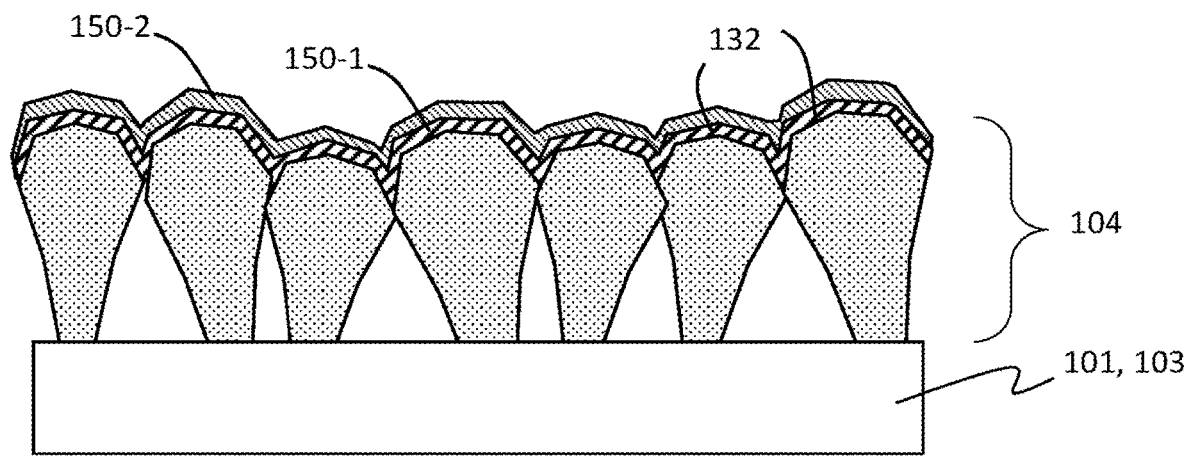
FIG. 11 is a cross-sectional view of an anode that includes multiple supplemental layers according to some embodiments of the present disclosure.

In some embodiments, as shown in FIG. 11, the anode may include a first supplemental layer 150-1 and a second supplemental layer 150-2. FIG. 11 illustrates an embodiment where the first and second supplemental layers are provided primarily over the top portion of the first microstructures, but in some embodiments, one or both supplemental layers are further provided over more or all of the first microstructures in a manner similar to that shown in FIG. 10B. In some embodiments, the first supplemental layer 150-1 may include silicon nitride or a first metal compound. The second supplemental layer 150-2 has a composition different from the first supplemental layer and may include silicon nitride or a second metal compound.

In some embodiments, the first supplemental layer 150-1 and the optional second or additional supplemental layers may help stabilize the lithium storage structure by providing a barrier to direct electrochemical reactions with solvents or electrolytes that can degrade the interface. The supplemental layer(s) are generally conductive to lithium ions and permit lithium ions to move into and out of the lithium storage structures during charging and discharging. In some embodiments, the lithium ion conductivity of each supplemental layer may be at least $10^{-9}$ S/cm, alternatively at least $10^{-8}$ S/cm, alternatively at least $10^{-7}$ S/cm, or alternatively at least $10^{-6}$ S/cm. In some embodiments, the supplemental layer may function in part as a solid-state electrolyte. In some embodiments, the supplemental layer(s) are less electrically conductive than the lithium storage structure so that little or no electrochemical reduction of lithium ions to lithium (0) occurs at the supplemental layer/electrolyte interface. In addition to providing protection from electrochemical reactions, the multiple supplemental layer structure embodiments may provide superior structural support. In some embodiments, although the supplemental layers may flex and may form fissures when the first microstructures expand during lithiation, crack propagation can be distributed between the layers to reduce direct exposure of the lithium storage structure to the bulk electrolyte. For example, a fissure in the second supplemental layer may not align with a fissure in the second supplemental layer. Such an advantage may not occur if just one thick supplemental layer is used. In an embodiment, the second supplemental layer may be formed of a material having higher flexibility than the first supplemental layer.

In some embodiments, a supplemental layer (the first supplemental layer, the second supplemental layer, or any additional supplemental layer(s)), may include silicon nitride, e.g., substantially stoichiometric silicon nitride where the ratio of nitrogen to silicon is about 1.33, alternatively in a range of 1.33 to 1.25. A supplemental layer comprising silicon nitride may have a thickness in a range of about 0.5 nm to about 50 nm, alternatively about 5 nm to about 40 nm, alternatively 1 nm to 10 nm, alternatively 10 nm to 20 nm, alternatively 20 nm to 30 nm, alternatively 30 nm to 40 nm, alternatively 40 nm to 50 nm, or any combination of contiguous ranges thereof. Silicon nitride may be deposited by an atomic layer deposition (ALD) process or by a CVD process. In some embodiments, the lithium storage filamentary structures include silicon deposited by some type of CVD process as described above, and at the end, a nitrogen gas source is added to the CVD deposition chamber along with the silicon source.

In some embodiments a supplemental layer (the first supplemental layer, the second supplemental layer, or any additional supplemental layer(s)) may include a metal compound. In some embodiments, the metal compound may include is a metal oxide, metal nitride, or metal oxynitride, e.g., those containing a transition metal, aluminum, titanium, vanadium, zirconium, germanium or tin, or mixtures thereof. In some embodiments a metal oxide or metal oxynitride may include some corresponding metal hydroxide. In some embodiments, a supplemental layer including a simple metal oxide, metal nitride, or metal oxynitride, may have an average thickness of less than about 100 nm, for example, in a range of about 0.5 nm to about 50 nm, or alternatively in a range of about 5 nm to about 40 nm, alternatively 1 nm to 10 nm, alternatively 10 nm to 20 nm, alternatively 20 nm to 30 nm, alternatively 30 nm to 40 nm, alternatively 40 nm to 50 nm. The metal oxide, metal nitride, or metal oxynitride may include other components or dopants such as phosphorous or silicon.

In some embodiments, the metal compound may include a lithium-containing material such as lithium phosphorous oxynitride (LIPON), a lithium phosphate, a lithium aluminum oxide, or a lithium lanthanum titanate. In some embodiments, the thickness of supplemental layer including a lithium-containing material may be in a range of 0.5 nm to 200 nm, alternatively 1 nm to 10 nm, alternatively 10 nm to 20 nm, alternatively 20 nm to 30 nm, alternatively 30 nm to 40 nm, alternatively 40 nm to 50 nm, alternatively 50 nm to 100 nm, alternatively 100 to 200 nm, or any combination of contiguous ranges thereof.

In some embodiments the metal compound may be deposited by a process comprising ALD, thermal evaporation, sputtering, or e-beam evaporation. ALD is a thin-film deposition technique typically based on the sequential use of a gas phase chemical process. The majority of ALD reactions use at least two chemicals, typically referred to as precursors. These precursors react with the surface of a material one at a time in a sequential, self-limiting, manner. Through the repeated exposure to separate precursors, a thin film is deposited, often in a conformal manner. In addition to conventional ALD systems, so-called spatial ALD (SALD) methods and materials can be used, e.g., as described U.S. Pat. No. 7,413,982, the entire contents of which are incorporated by reference herein for all purposes. In certain embodiments, SALD can be performed under ambient conditions and pressures and have higher throughput than conventional ALD systems.

In some embodiments, the process for depositing the metal compound may include electroless deposition, contact with a solution, contact with a reactive gas, or electrochemical methods. In some embodiments, a metal compound may be formed by depositing a metallic layer (including but not limited to thermal evaporation, CVD, sputtering, e-beam evaporation, electrochemical deposition, or electroless deposition) followed by treatment to convert the metal to the metal compound (including but not limited to, contact with a reactive solution, contact with an oxidizing agent, contact with a reactive gas, or a thermal treatment).

Figure 12A:
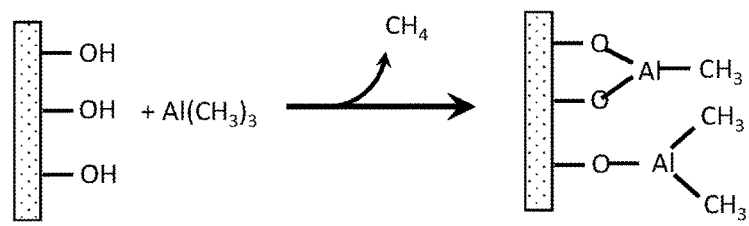
FIGS. 12A-12C show an example set of processing steps for forming an inorganic-organic hybrid structure.
Figure 12B:
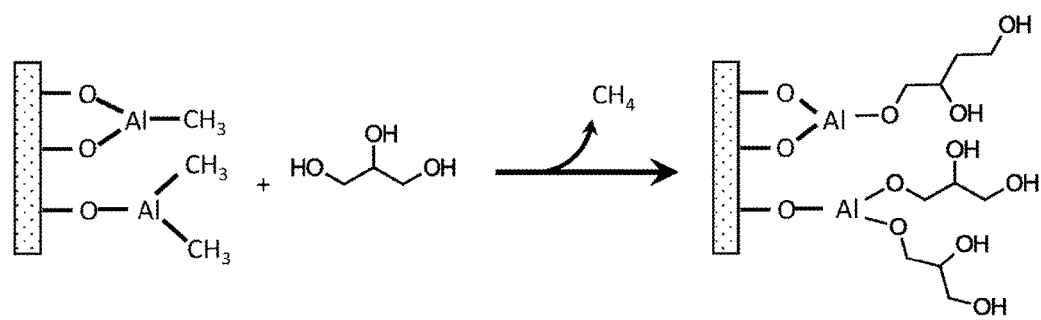
Figure 12C:
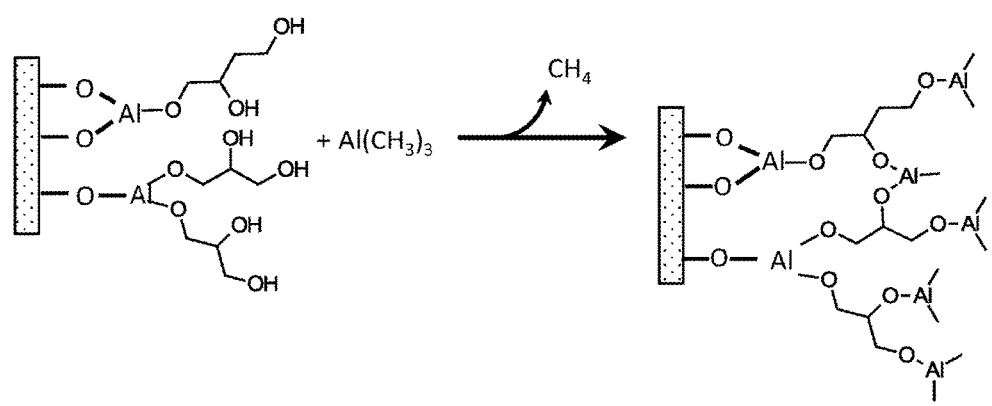

In some embodiments, the metal compound may include an organic material bound to a metal or to a metal oxide. In some embodiments, a supplemental layer may include an inorganic-organic hybrid structure having alternating sublayers of metal oxide and bridging organic materials such as so-called "metalcone" materials (and which are herein included as a type of metal compound that may be suitable for one or more supplemental layers). In some embodiments, a supplemental layer that includes a metalcone may provide improved flexibility to accommodate volume changes in the lithium-storage material during lithiation and de-lithiation. Metalcones may be made using a combination of atomic layer deposition to apply the metal oxide and molecular layer deposition (MLD) to apply the organic. This may also form a coating that is largely conformal due to the self-limiting nature of the reactions. The organic bridge is typically a molecule having multiple functional groups. One group can react with a sublayer comprising a metal oxide and the other group is available to react in a subsequent ALD step to bind a new metal. The process is shown schematically in FIGS. 12A-12C wherein the metal is aluminum and the reactive organic functional groups are hydroxy groups of glycerol. There is a wide range of reactive organic functional groups that may be used including, but not limited to hydroxy, carboxylic acid, amines, acid chlorides and anhydrides. Although not shown, the structure in FIG. 12C may be treated again with glycerol or some other reactive organic material to react with aluminum and release methane. Alternatively, the methyl-aluminum bonds of FIG. 12C may be oxidized with an oxygen source. In any event, the cycle can continue to optionally form numerous alternating sublayers, which can end with either application of the reactive organic material (i.e., the final organic layer is not functioning as a bridge to another metal layer) or with the metal-containing material. Components of the sublayers can be varied between cycles. For the purposes of the present disclosure, this alternating sublayer structure is considered a single supplemental layer. Almost any metal precursor suitable for ALD deposition can be used. Some non-limiting examples include ALD compounds for aluminum (e.g., trimethyl aluminum), titanium (e.g., titanium tetrachloride), zinc (e.g., diethyl zinc), and zirconium (tris(dimethylamino)cyclopentadienyl zirconium). As mentioned, the supplemental layers should allow transport of lithium ions. In some embodiments, the organic bridging materials may include additional functional groups that are not involved in layer binding but help facilitate such transport. In an embodiment, these additional functional groups are oxygen-containing, such as (unreacted) hydroxy or ether groups. The organic bridging material may include aliphatic, aromatic, heteroaromatic or a combination of carbon structures. The organic bridging material may include cross-linkable groups such as epoxy groups, double bonds or triple bonds that can be thermally, chemically or photo cross-linked after deposition. The alternating organic-inorganic sublayers within the supplemental layer is not limited to a single set. Different organic materials and inorganic compounds may be used to form the inorganic-organic hybrid supplemental layer. In some embodiments, a supplemental layer having a structure of alternating inorganic-organic hybrid sublayers may have a thickness in a range of 0.5 nm to 200 nm, alternatively 1 nm to 10 nm, alternatively 10 nm to 20 nm, alternatively 20 nm to 30 nm, alternatively 30 nm to 40 nm, alternatively 40 nm to 50 nm, alternatively 50 nm to 100 nm, alternatively 100 to 200 nm, or any combination of contiguous ranges thereof.

Organic Material Capping Layer

Figure 13:
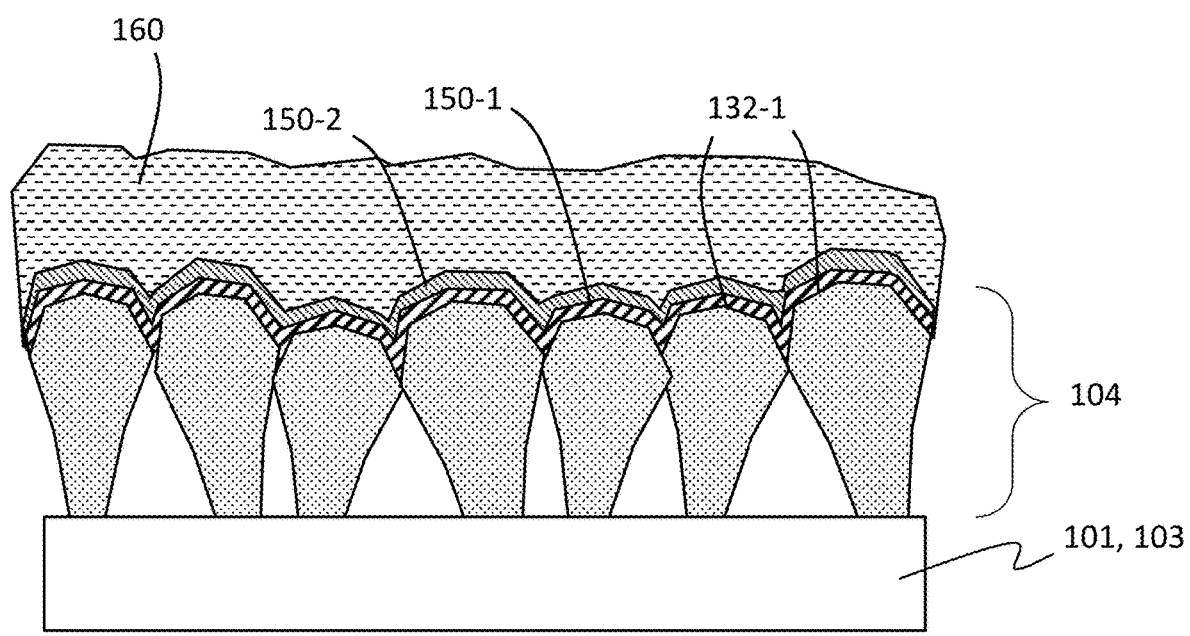
FIG. 13 is a cross-sectional view of an anode that includes multiple supplemental layers and a capping layer according to some embodiments of the present disclosure.

In some embodiments as shown in FIG. 13, the anode may include an organic material capping layer 160 attached (e.g., adsorbed or bonded) to the lithium storage structure or outermost supplemental layer, in this example, the second supplemental layer 150-2. The outermost supplemental layer may be the supplemental layer disposed farthest from the electrically conductive layer. Additionally, the outermost supplemental layer may be the supplemental layer with the largest average or median distance from the electrically conductive layer.

Unlike metalcones, the organic material capping layer of this disclosure does not have an alternating structure of inorganic/organic sublayers. In some embodiments, the organic material capping layer may be provided in part via a chemical reaction between a reactive functional group of an organic material and a supplemental layer having a correspondingly reactive surface. In some embodiments, the organic material capping layer may be a monolayer. In some embodiments, the organic material capping layer may be formed over an outermost supplemental layer containing a metal compound. In some embodiments, the organic material capping layer is formed over an outermost supplemental layer containing a metal oxide. In some embodiments, chemistry similar to that described above with respect to metalcones may be used where organic compounds have appropriate reactive groups such as hydroxy, carboxylic acid, amines and anhydrides, capable of reacting with metal bonds of an outermost supplemental layer (e.g., metal-carbon or metal-halogen). In some embodiments, the outermost supplemental layer may not initially include metal-carbon or metal-halogen bonds, but its surface may be modified to include such bonds prior to treating with the reactive organic compound. As with supplemental layers, the capping layer should also be conductive to lithium ion diffusion.

Alternatively, rather than reacting with metal-carbon or metal-halogen bonds, some organic materials may react with, or chemisorb to, a metal oxide- or metal hydroxide-containing outermost supplemental layer, e.g., aluminum oxide or titanium oxide. Such organic materials may include appropriate functional groups such as hydroxyl, carboxylic acid, amines, amino acid, esters, ethers, acid chlorides or anhydrides to aid in the reaction or chemisorption. The organic compounds forming the organic material capping layer may include small molecules, large molecules or polymers so long as they have appropriate reactive groups. Depending on the particular properties of the chemical, the organic compound may be applied by vapor deposition, from a solution in an inert solvent or as a neat liquid. The organic materials may include additional functional groups that are not involved in layer binding that help facilitate transport of lithium ions. In some embodiments, these additional functional groups are oxygen-containing, such as hydroxy or ether groups, or alternatively carboxylate or sulfonate groups. The organic material may include cross-linkable groups such as epoxy, double bonds, or triple bonds that may be thermally, chemically or photo cross-linked after deposition. The organic compounds may include aliphatic, aromatic, heteroaromatic, or a combination of carbon structures. The organic material capping layer may have greater flexibility than pure inorganic materials and can be tailored to provide high lithium ion diffusion.

Figure 14A:
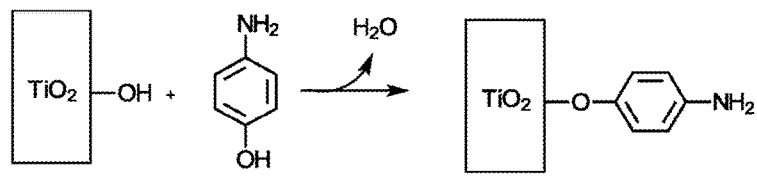
FIGS. 14A-14C show an example set of processing steps for modifying a metal oxide surface with a material capable of polymerization or cross-linking.
Figure 14B:
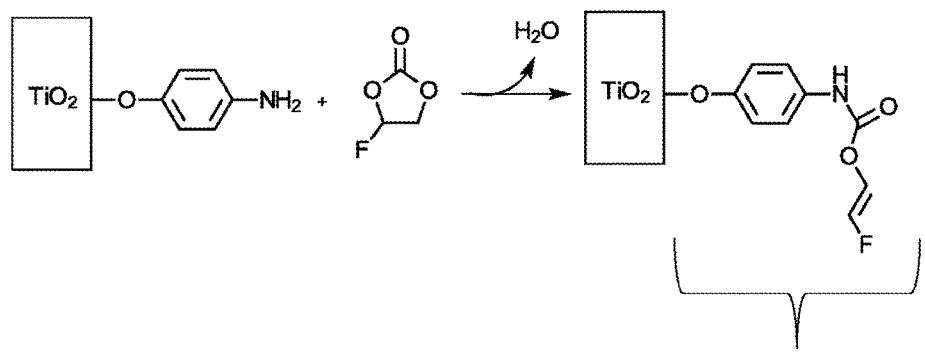
Figure 14C:
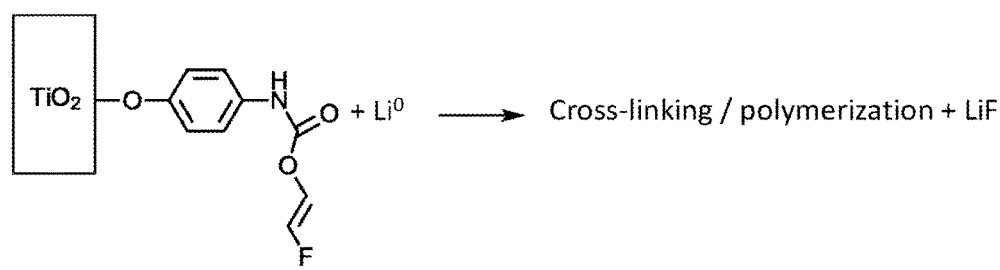

In some embodiments, a supplemental layer surface may include or bind a first organic material that can then react with another organic material to form a reaction product, for example, a polymerizable material. FIG. 14 shows one such example. In this example, aminophenol is first bound to a surface of a metal oxide/hydroxide, e.g., titanium dioxide having some hydroxy groups at the surface (FIG. 14A). The metal oxide/hydroxide may be the surface of an outermost supplemental layer. The free amine group is then reacted with fluoroethylenecarbonate (FEC), FIG. 14B. FEC is sometimes used in conventional lithium ion batteries as a stabilizing additive in the electrolyte. In this embodiment, however, the FEC reacts with the amine to form a fluorinated double bond that, during the first battery lithiation step, can cross link or polymerize with release of LiF (FIG. 14C). The product of the reaction of the bound aminophenol and FEC may be the capping layer 160 in this embodiment.

Many of the above-mentioned methods may result in organic material capping layers that that are largely conformal with the contours of the underlying structure, which in some embodiments, may provide more control over the critical interfaces than simply coating a polymer over the array of lithium storage filamentary structures. In some embodiments, the lithium ion conductivity of the organic material capping layer may be at least $10^{-7}$ S/cm, alternatively at least $10^{-6}$ S/cm, alternatively at least $10^{-5}$ S/cm, or alternatively at least $10^{-4}$ S/cm.

In some embodiments, rather than having first and second supplemental layers, the anode may include just a single supplemental layer and an organic material capping layer provided over at least a portion of the single supplemental layer. The single supplemental layer may include silicon nitride or a metal compound, as previously described with respect to other supplemental layers. In some embodiments, the anode may have no supplemental layer and only a capping layer over the lithium storage structure.

The thickness of the capping layer can vary widely depending on composition and methods. In some embodiments the capping layer has a thickness of at least 0.5 nm, alternatively at least 1 nm, alternatively at least 10 nm, alternatively at least 100 nm. In some embodiments, the capping layer has a thickness in a range of 0.5 nm to 1.0 nm, alternatively 1.0 to 10 nm, alternatively 10 nm to 100 nm, alternatively 100 nm to 1000 nm, alternatively 1000 nm to 5000 nm, or any combination of contiguous ranges thereof. In some embodiments, the capping layer is thicker than any supplemental layer or alternatively thicker than the combination of all supplemental layers.

Interstitial Layer

Figure 15:
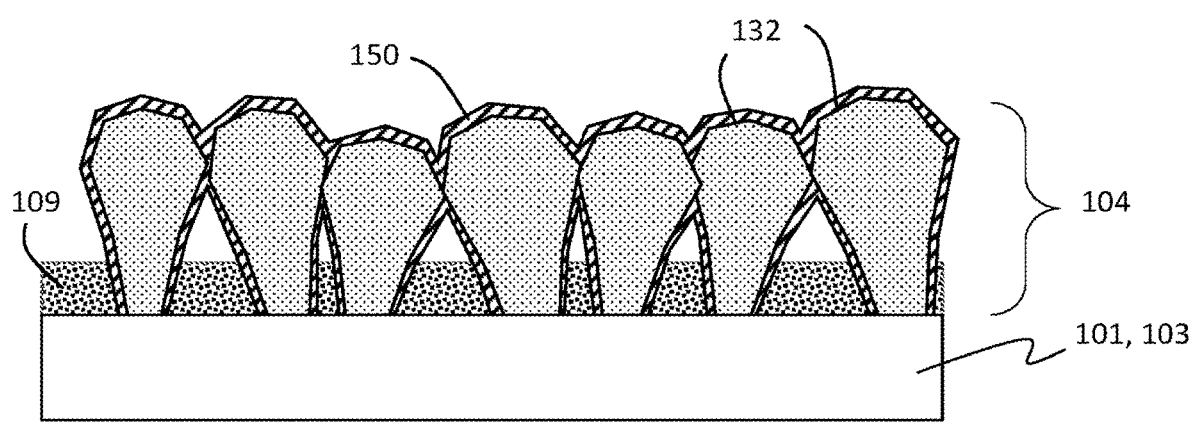
FIG. 15 is a cross-sectional view of an anode that includes an interstitial layer according to some embodiments of the present disclosure.

In some embodiments, FIG. 15 shows interstitial layer 109 provided over the current collector and filling space between adjacent first microstructures 132, at least at the base of such structures. In this figure, it is provided after formation of a supplemental layer 150, but it in other embodiments it could have been provided prior to application of one or more supplemental layers, or there may be no supplemental layer at all. In some embodiments, interstitial layer 109 may include a polymer or other insulator that adds structural support to the base of the first microstructures to reduce delamination or breakage at the current collector. In some embodiments, the interstitial layer may help insulate exposed portions of the current collector from unwanted electrochemical reactions.

In an embodiment, interstitial layer 109 may be a coating formed by a sol gel reaction. For example, a coating solution may include a solvent, a hydrophilic polymer, a reactive sol-gel precursor and an acid- or base-catalyst. The polymer may be, for example, a polyethylene oxide (PEO), in particular, an hydroxy-modified polyethylene oxide ($[PEO]_n$—$OH_m$) where n is the degree of polymerization of the polymer and m is the degree of substitution of hydroxyl. Alternatively, the hydrophilic polymer may instead be an hydroxy-modified poly-vinylpyrrolidone. The reactive sol-gel precursor may be a metal alkoxide including, but not limited to, tetraethyleneoxidesilane (TEOS). The mechanical properties may be controlled by the ratio of ($[PEO]_n$—$OH_m$) to TEOS. The higher the ratio, the more hydrophilic the composite will be. The ionic conductivity will generally be higher as well. The lower the ratio, the stronger the composite will generally be. These generalizations may further depend on the particular chemical features of the polymer.

Interstitial layer 109 may not be confined solely to the base region of the lithium storage structure. In some embodiments, the thickness T of interstitial layer 109 may be at least 2% the average height of the first microstructures, alternatively at least 5%, alternatively at least 10%, alternatively at least 20%, alternatively at least 30%, alternatively at least 50%, alternatively at least 75%, alternatively at least 100%, alternatively at least 125%. In some embodiments the interstitial layer is conductive to lithium ions, including but not limited to, when the thickness of the interstitial layer is at least 5% of the average height of the lithium storage filamentary structures. In some embodiments, the lithium ion conductivity of the interstitial layer may be at least $10^{-7}$ S/cm, alternatively at least $10^{-6}$ S/cm, alternatively at least $10^{-5}$ S/cm, or alternatively at least $10^{-4}$ S/cm.

Other Anode Features

In some embodiments, the current collector may include one or more features to ensure that a reliable electrical connection can be made when constructing a battery, e.g., tabs or areas free of lithium storage material.

In some embodiments the anode is at least partially prelithiated, i.e., the lithium storage structure (and first microstructures) include some lithium ("lithiated microstructures") prior to final battery assembly along with a cathode. In some embodiments, lithium may be incorporated into the lithium storage structure before forming one or more supplemental layers. In some embodiments, lithium may be incorporated into the lithium storage structure after forming one or more supplemental layers. In some embodiments, supplemental layers may be used to control the rate of lithium incorporation into the lithium storage structure.

Note that the term "lithiated storage structure" simply means that at least some of the potential storage capacity of the lithium storage structure is filled, but not necessarily all. In some embodiments, the lithiated storage structure structures may include lithium in a range of 1% to 5% of their theoretical lithium storage capacity, alternatively 5% to 10%, alternatively 10% to 20%, alternatively, 20% to 50%, alternatively 50% to 70%, alternatively 70% to 90%, alternatively 90% to 100%, or any combination of contiguous ranges thereof.

In some embodiments prelithiation may include depositing lithium metal over the lithium storage structure, with or without one or more supplemental layers, by evaporation, e-beam or sputtering. Alternatively, prelithiation may include contacting the lithium storage structure, with or without one or more supplemental layers, with a reductive lithium compound, e.g., lithium naphthalene, n-butyllithium or the like. In some embodiments, prelithiation may include incorporating lithium by electrochemical reduction of lithium ion in prelithiation solution.

In some embodiments, prelithiation includes physical contact of the lithium storage structure, with or without one or more supplemental layers, with a lithium metal-containing material. The lithium metal-containing material may include a lithium foil, a lithium metal layer provided on a substrate, or a stabilized lithium metal powder. Stabilized lithium metal powders ("SLMP") typically have a phosphate, carbonate, wax, or other coating over the lithium metal particles, e.g. as described in U.S. Pat. Nos. 8,377,236, 6,911,280, 5,567,474, 5,776,369, and 5,976,403, the entire contents of which are incorporated herein by reference. In some embodiments SLMPs may require physical pressure to break the coating and allow incorporation of the lithium.

In some embodiments, prelithiation may include a thermal treatment step during lithium incorporation, after lithium incorporation, or both during and after. The thermal treatment may assist in the incorporation of the lithium into the first microstructures, for example by promoting lithium diffusion. In some embodiments, thermally treating includes exposing the anode to a temperature in a range of 40° C. to 250° C. Thermal treatment may be performed under controlled atmosphere, e.g., under vacuum or argon atmosphere to avoid unwanted reactions with oxygen, nitrogen, water or other ambient gasses.

In some embodiments, prelithiation may soften the lithium storage structure, for example, due to the formation of a lithium-silicon alloy. This softening may cause problems in some processes, for example, roll-to-roll processes whereby the softened lithium storage material begins to stick to rollers or to itself during winding. In some embodiments providing at one or more supplemental layers prior to prelithiation or after prelithiation, the structural integrity and processability of the anode may be substantially improved. In some embodiments, the supplemental layer(s) may act as a harder interface with other surfaces to prevent or reduce contact of such surfaces with the softened lithium storage material.

Thermal treatments were discussed above with respect to prelithiation, but in some embodiments the anode may be thermally treated prior to battery assembly, with or without a prelithiation step. In some embodiments, thermally treating the anode may improve adhesion of the various layers or electrical conductivity, e.g., by inducing migration of metal from the current collector or atoms from an optional supplemental layer into the first microstructures. In some embodiments, thermally treating the anode may be done in a controlled environment having a low oxygen and water content (e.g., less than 10 ppm or partial pressure of less than 0.1 Torr, alternatively less than 0.01 Torr) to prevent degradation. In some embodiments, anode thermal treatment may be carried out using an oven, infrared heating elements, contact with a hot plate or exposure to a flash lamp. The anode thermal treatment temperature and time depend on the materials of the anode. In some embodiments, anode thermal treatment includes heating the anode to a temperature of at least 40° C., optionally in a range of 40° C. to 600° C., alternatively 100° C. to 250° C., alternatively 250° C. to 350° C., alternatively 350° C. to 450° C., alternatively 450° C. to 600° C., or a combination of these ranges. In some embodiments, a thermal treatment may be applied for time period of 0.1 to 120 minutes.

In some embodiments one or more processing steps described above may be performed using roll-to-roll methods wherein the electrically conductive layer or current collector is in the form of a rolled film, e.g., a roll of metal foil, mesh or fabric Battery Features The preceding description relates primarily to the anode/negative electrode of a lithium-ion battery (LIB). The LIB typically includes a cathode/positive electrode, an electrolyte and a separator (if not using a solid-state electrolyte). As is well known, batteries can be formed into multilayer stacks of anodes and cathodes with an intervening separator. Alternatively, a single anode/cathode stack can be formed into a so-called jellyroll. Such structures are provided into an appropriate housing having desired electrical contacts.

In some embodiments, the battery may be constructed with confinement features to limit expansion of the battery, e.g., as described in US published applications 2018/0145367 and 2018/0166735, the entire contents of which are incorporated herein by reference. In some embodiments a physical pressure is applied between the anode and cathode, e.g., using a tensioned spring or clip, a compressible film or the like. Confinement, pressure or both may help ensure that the anode remains in active contact with the current collector during formation and cycling, which may cause expansion and contraction of the lithium storage structure.

Cathode

Examples of positive electrode (cathode) materials include, but are not limited to, lithium metal oxides or compounds (e.g., $LiCoO_2$, $LiFePO_4$, $LiMnO_2$, $LiNiO_2$, $LiMn_2O_4$, $LiCoPO_4$, $LiNi_xCo_yMn_zO_2$, $LiNi_xCo_yAl_zO_2$, $LiFe_2(SO_4)_3$, or $Li_2FeSiO_4$), carbon fluoride, metal fluorides such as iron fluoride ($FeF_3$), metal oxide, sulfur, selenium, and combinations thereof. Cathode active materials are typically provided on, or in electrical communication with, an electrically conductive cathode current collector.

Current Separator

The current separator allows ions to flow between the anode and cathode but prevents direct electrical contact. Such separators are typically porous sheets. Non-aqueous lithium-ion separators may be single layer or multilayer polymer sheets, typically made of polyolefins, especially for small batteries. Most commonly, these are based on polyethylene or polypropylene, but polyethylene terephthalate (PET) and polyvinylidene fluoride (PVdF) can also be used. For example, a separator may have >30% porosity, low ionic resistivity, a thickness of ~10 to 50 μm and high bulk puncture strengths. Separators may alternatively include ceramic materials or multilayer structures, e.g., to provide higher mechanical and thermal stability.

Electrolyte

The electrolyte in lithium ion cells may be a liquid, a solid, or a gel. A typical liquid electrolyte comprises one or more solvents and one or more salts, at least one of which includes lithium. During the first few charge cycles (sometimes referred to as formation cycles), the organic solvent and/or the electrolyte may partially decompose on the negative electrode surface to form an SEI (Solid-Electrolyte-Interphase) layer. The SEI is generally electrically insulating but ionically conductive, thereby allowing lithium ions to pass through. The SEI may lessen decomposition of the electrolyte in the later charging cycles.

Some non-limiting examples of non-aqueous solvents suitable for some lithium ion cells include the following: cyclic carbonates (e.g., ethylene carbonate (EC), fluoroethylene carbonate (FEC), propylene carbonate (PC), butylene carbonate (BC) and vinylethylene carbonate (VEC)), vinylene carbonate (VC), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC, also commonly abbreviated EMC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitriles (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), organic compounds containing an S=O group (e.g., dimethyl sulfone and divinyl sulfone), and combinations thereof.

Non-aqueous liquid solvents can be employed in combination. Examples of these combinations include combinations of cyclic carbonate-linear carbonate, cyclic carbonate-lactone, cyclic carbonate-lactone-linear carbonate, cyclic carbonate-linear carbonate-lactone, cyclic carbonate-linear carbonate-ether, and cyclic carbonate-linear carbonate-linear ester. In some embodiments, a cyclic carbonate may be combined with a linear ester. Moreover, a cyclic carbonate may be combined with a lactone and a linear ester. In a specific embodiment, the ratio of a cyclic carbonate to a linear ester is between about 1:9 to 10:1, alternatively 2:8 to 7:3, by volume.

A salt for liquid electrolytes may include one or more of the following non-limiting examples: $LiPF_6$, $LiBF_4$, $LiClO_4$, $LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, lithium salts having cyclic alkyl groups (e.g., $(CF_2)_2(SO_2)_{2x}Li$ and $(CF_2)_3(SO_2)_{2x}Li$), and combinations thereof. Common combinations include: $LiPF_6$ and $LiBF_4$; $LiPF_6$ and $LiN(CF_3SO_2)_2$; and $LiBF_4$ and $LiN(CF_3SO_2)_2$.

In some embodiments, the total concentration of salt in a liquid non-aqueous solvent (or combination of solvents) is at least 0.3 M, alternatively at least 0.7 M. The upper concentration limit may be driven by a solubility limit and operational temperature range. In some embodiments, the concentration of salt is no greater than about 2.5 M, alternatively no more than about 1.5 M.

In some embodiments, the battery electrolyte includes a non-aqueous ionic liquid and a lithium salt.

A solid electrolyte may be used without the separator because it serves as the separator itself. It is electrically insulating, ionically conductive, and electrochemically stable. In the solid electrolyte configuration, a lithium containing salt, which could be the same as for the liquid electrolyte cells described above, is employed but rather than being dissolved in an organic solvent, it is held in a solid polymer composite. Examples of solid polymer electrolytes may be ionically conductive polymers prepared from monomers containing atoms having lone pairs of electrons available for the lithium ions of electrolyte salts to attach to and move between during conduction, such as polyvinylidene fluoride (PVDF) or chloride or copolymers of their derivatives, poly(chlorotrifluoroethylene), poly(ethylene-chlorotrifluoroethylene), or poly(fluorinated ethylene-propylene), polyethylene oxide (PEO) and oxymethylene linked PEO, PEO-PPO-PEO crosslinked with trifunctional urethane, poly(bis(methoxy-ethoxy-ethoxide))-phosphazene (MEEP), triol-type PEO crosslinked with difunctional urethane, poly((oligo)oxyethylene)methacrylate-co-alkali metal methacrylate, polyacrylonitrile (PAN), polymethylmethacrylate (PMMA), polymethylacrylonitrile (PMAN), polysiloxanes and their copolymers and derivatives, acrylate-based polymer, other similar solvent-free polymers, combinations of the foregoing polymers either condensed or cross-linked to form a different polymer, and physical mixtures of any of the foregoing polymers. Other less conductive polymers that may be used in combination with the above polymers to improve the strength of thin laminates include: polyester (PET), polypropylene (PP), polyethylene naphthalate (PEN), polyvinylidene fluoride (PVDF), polycarbonate (PC), polyphenylene sulfide (PPS), and polytetrafluoroethylene (PTFE). Such solid polymer electrolytes may further include a small amount of organic solvents listed above. The polymer electrolyte may be an ionic liquid polymer. Such polymer-based electrolytes can be coated using any number of conventional methods such as curtain coating, slot coating, spin coating, inkjet coating, spray coating or other suitable method.

Additives may be included in the electrolyte to serve various functions. For example, additives such as polymerizable compounds having an unsaturated double bond may be added to stabilize or modify the SEI. Certain amines or borate compounds can act as cathode protection agents. Lewis acids can be added to stabilize fluorine-containing anion such as $PF_6^-$. Safety protection agents include those to protect overcharge, e.g., anisoles, or act as fire retardants, e.g., alkyl phosphates.

In some embodiments, the original, non-cycled anode may undergo structural or chemical changes during electrochemical charging/discharging, for example, from normal battery usage or from an earlier "electrochemical formation step". As is known in the art, an electrochemical formation step is commonly used to form an initial SEI layer and involves relatively gentle conditions of low current and limited voltages. The modified anode prepared in part from such electrochemical charging/discharging cycles may still have excellent performance properties, despite such structural and/or chemical changes relative to the original, non-cycled anode.

EXAMPLES

A 16 μm thick nickel foil was cleaned with an IPA wipe and was used as the current collector/electrically conductive layer.

Comparative Anode C-1

Silicon was deposited current collectors using expanding thermal PECVD at elevated temperature for a portion of the time to allow silicon-containing nanowires grow and produce Comparative Anode C-1. The deposition gases were silane at about 0.20 slm (standard liters per minute) and hydrogen at about 0.20 slm, along with an argon carrier gas at about 2 slm. The process pressure was about 0.145 mbar. Comparative Anode was black in appearance and had a total reflectance at 550 nm of about 5%.

Example Anode E-1

The same process used to form Comparative Anode C-1 was used but repeated four additional times to form Example Anode 1, which was metallic gray in appearance and had a total reflectance at 550 nm of about 26%.

Example Anode E-2

A process similar to Comparative Anode C-1, except that the hydrogen flow rate was reduced to 0.1 slm and repeated one additional time. Example Anode E-2 was metallic gray in appearance and had a total reflectance at 550 nm of about 19%.

SEM

Microstructure differences between the anodes are readily apparent as shown in FIGS. 16-18. FIGS. 16A and 16B are SEM perspective and top view views, respectively, of Comparative Anode C-1. FIGS. 17A and 17B are SEM perspective and top view views, respectively, of Example Anode E-1. FIGS. 18A and 18B are SEM perspective and top view views, respectively, of Example Anode E-2. As can be readily seen, Comparative Anode C-1 has much open space between high aspect ratio nanowires. On the other hand, Example Anodes E-1 and E2 have first microstructures that are densely packed with less open space compared to C-1. EDS analyses of nickel and silicon were performed on a 40 μm×40 μm area as described earlier.

All anodes show some variability in the structural dimensions. Many of Anode C-1 structures are approximately 10 μm high and have a maximum width of about 2 μm (aspect ratio of about 5). Many of Anode E-1 microstructures are about 17 μm high and have a maximum width of about 7 μm (aspect ratio of about 2.1). Many of Anode E-2 microstructures are about 10 μm high and have a maximum width of about 5.5 μm (aspect ratio of about 1.8).

Electrochemical Testing—Half Cells

Half cells were constructed using a 1.27 cm diameter punch of each anode. Lithium metal served as the counter electrode which was separated from the test anode using two Celgard™ 2500 separators. A solution of 1.0 M $LiPF_6$ in 3:7 EC:EMC (volume ratio) with 10% FEC (weight %) and 2% VC (weight %) was used as the electrolyte. Anodes first underwent an electrochemical formation step. As is known in the art, the electrochemical formation step is used to form an initial SEI layer. Relatively gentle conditions of low current and/or limited voltages may be used to ensure that the anode is not overly stressed. In the present examples, electrochemical formation included 8 cycles over a wide voltage range (0.01 or 0.06 to 1.2V) with the first cycle carried out at C/20 of the full anode capacity, the 2nd cycle at C/10, cycles 3-7 at C/5, and cycle 8 at C/20. The total active silicon ($mg/cm^2$) available for reversible lithiation and total charge capacity ($mAh/cm^2$) were determined from the electrochemical formation step data. While silicon has a theoretical charge capacity of about 3600 mAh/g when used in lithium-ion batteries, it has been found that cycle life significantly improves if only a portion of the full capacity is used. For all anodes, the performance cycling was set to use about a third of the total capacity, i.e., about 1200 mAh/g. The performance cycling protocol included 3C charging (considered aggressive in the industry) and C/3 discharging to roughly a 20% state of charge. A 10-minute rest was provided between charging and discharging cycles. In some commercial uses, the anodes should have a cycle life of at least 100 cycles, meaning that the charge capacity should not fall lower than 80% of the initial charge capacity after 100 cycles. All anodes achieved this goal. Further tests in progress using different electrochemical formation protocols, but the same performance cycling, have found anodes like E-1 to have cycle life greater than 480 cycles. Table 1 summarizes information relating to the anodes with respect to various properties and performance.

TABLE 1

| Property | C-1 | E-1 | E-2 |
| --- | --- | --- | --- |
| Active Si ($mg/cm^2$) | 0.35 | 1.15 | 1.12 |
| Initial charge capacity ($mAh/cm^2$) | 0.44 | 1.42 | 1.39 |
| Cycle life at least 100 cycles? | Yes | Yes | Yes |
| Approximate height (μm) | 10 | 17 | 10 |
| Approximate maximum width (μm) | 2 | 8 | 5.5 |
| Approximate aspect ratio | 5.0 | 2.1 | 1.8 |
| % total reflectance at 550 nm | 5 | 26 | 19 |
| Atomic % Ni by EDS | 12.2 | 0.62 | 0.56 |
| Atomic % Si by EDS | 77.3 | 99.3 | 98.6 |

While comparative anode C-1 has good cycle life, it has insufficient charge capacity. To be viable for most commercial uses, the charge capacity of an anode should be at least 1 $mAh/cm^2$. Despite teachings in the prior art that silicon-based anodes require significant feature spacing and/or high aspect ratio features, it has been unexpectedly found anodes of the present disclosure show that high cycle life and high charge capacity can be achieved using tightly packed, lower aspect ratio structures. In some embodiments, anodes of the present disclosure may provide a lithium ion battery having operational charge capacity of at least 1 $mAh/cm^2$ and a cycle life of at least 100 cycles, alternatively at least 200 cycles, alternatively at least 300 cycles, alternatively at least 400 cycles.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific embodiment may not always be present in variations of that embodiment or may be added to other embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the layer" includes reference to one or more layers and equivalents thereof known to those skilled in the art, and so forth. The invention has now been described in detail for the purposes of clarity and understanding. However, it will be appreciated that certain changes and modifications may be practiced within the scope of the appended claims.

All publications, patents, and patent applications cited herein are hereby incorporated by reference in their entirety for all purposes. None is admitted to be prior art.

The invention claimed is:

1. An anode for an energy storage device, the anode comprising:
   a current collector comprising an electrically conductive layer; and
   a lithium storage structure comprising a plurality of first microstructures in contact with the electrically conductive layer, wherein:
   (i) each first microstructure comprises silicon, each first microstructure is characterized by a first maximum width measured across the widest section orthogonal to a first microstructure axis, each first microstructure comprises a first portion, the first portion characterized by the width substantially tapering from the maximum width to a location where each first microstructure contacts the electrically conductive layer, and each first microstructure comprises a second portion, the second portion positioned farther away from the electrically conductive layer than the first portion is from the electrically conductive layer, the second portion defining a substantially hemispherical shape and a top of each first microstructure, wherein at least 90% of all first microstructures are in contact with at least two other first microstructures, wherein the contact is above the electrically conductive layer, (ii) the electrically conductive layer comprises nickel or copper, (iii) the lithium storage structure comprises at least 3 mg/cm$^2$ of active silicon, and (iv) a portion of the lithium storage structure comprising the surface of the lithium storage structure comprises a total atomic % of nickel and copper in a range from 0.05% to 1.2%.

2. The anode of claim 1, wherein each first microstructure is characterized by: i) a first height measured from the electrically conductive layer to its end along the first microstructure axis; ii) a first maximum width orthogonal to the first microstructure axis; and wherein the first height is at least 9 μm and the first maximum width is at least 4.5 μm.

3. The anode of claim 2, wherein a first aspect ratio is defined as the first height divided by the first maximum width, and each first microstructure has the first aspect ratio in a range of 1.8 to 4.0.

4. The anode of claim 3, wherein the first maximum width is less than 10 μm.

5. The anode of claim 4, wherein the first height is less than 20 μm.

6. The anode of claim 3, wherein the lithium storage structure further comprises one or more second microstructures in contact with the conductive layer, wherein the one or more second microstructures comprise silicon and i) the one or more second microstructures are characterized by a second height, the second height being less than the first height, ii) the one or more second microstructures characterized by a second maximum width, the second maximum width being less than the first maximum width, or iii) the one or more second microstructures characterized by a second aspect ratio, the second aspect ratio being greater than the first aspect ratio.

7. The anode of claim 1, wherein the lithium storage structure has a total reflectance of at least 10% measured at 550 nm.

8. The anode of claim 1, further comprising one or more supplemental layers overlaying at least a portion of the lithium storage structure, at least one supplemental layer comprising silicon nitride or a metal compound.

9. The anode of claim 8, wherein the metal compound comprises a metal oxide, a metal nitride, a metal oxynitride, a lithium-containing material, or a metalcone.

10. The anode of claim 9, wherein the metal oxide is an oxide of a transition metal.

11. The anode of claim 9, wherein the metal oxide is an oxide of aluminum, titanium, or vanadium.

12. The anode of claim 9, wherein the metal nitride is a nitride of a transition metal.

13. The anode of claim 9, wherein the metal nitride is a nitride of germanium or tin.

14. The anode of claim 9, wherein the metal oxynitride is an oxynitride of a transition metal.

15. The anode of claim 9, wherein the metal oxynitride is an oxynitride of aluminum, titanium, vanadium, germanium, or tin.

16. The anode of claim 9, wherein the lithium-containing material comprises lithium phosphorous oxynitride, lithium phosphate, lithium aluminum oxide, or lithium lanthanum titanate.

17. The anode of claim 9, wherein the metalcone comprises aluminum or zirconium.

18. The anode of claim 1, further comprising a polymeric interstitial layer provided over the electrically conductive layer and between first microstructures.

19. The anode according to claim 1, wherein the total atomic % of nickel and copper is characterized by an EDS measurement over a lithium storage structure surface area of at least 1600 square microns.

20. The anode according to claim 1, wherein each first microstructure contacts the at least two other first microstructures through the second portion.

* * * * *